(12) United States Patent
Hentunen

(10) Patent No.: US 9,923,961 B2
(45) Date of Patent: Mar. 20, 2018

(54) INTEGRITY CHECK OF DNS SERVER SETTING

(71) Applicant: F-Secure Corporation, Helsinki (FI)

(72) Inventor: Daavid Hentunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/944,381

(22) Filed: Nov. 18, 2015

(65) Prior Publication Data

US 2016/0150004 A1    May 26, 2016

(30) Foreign Application Priority Data

Nov. 20, 2014 (GB) .................................. 1420618.9

(51) Int. Cl.
| H04L 29/08 | (2006.01) |
| H04L 29/06 | (2006.01) |
| H04L 29/12 | (2006.01) |

(52) U.S. Cl.
CPC ...... *H04L 67/1036* (2013.01); *H04L 61/1511* (2013.01); *H04L 63/1416* (2013.01); *H04L 63/1433* (2013.01); *H04L 63/1483* (2013.01); *H04L 61/2015* (2013.01)

(58) Field of Classification Search
CPC ............. H04L 67/1036; H04L 61/1511; H04L 63/1483; H04L 63/1416; H04L 63/1433; H04L 61/2015; H04L 43/405; H04L 29/12066
USPC ...................................................... 726/22–25
See application file for complete search history.

(56) References Cited

U.S. PATENT DOCUMENTS

| 8,316,440 | B1 | 11/2012 | Hsieh et al. ................. 726/22 |
| 8,458,769 | B2 * | 6/2013 | Dilley ................. H04L 63/0218 726/11 |
| 9,300,623 | B1 * | 3/2016 | Earl ................. H04L 61/1511 |
| 2004/0246948 | A1 * | 12/2004 | Lee ................. H04L 45/02 370/352 |
| 2006/0200487 | A1 * | 9/2006 | Adelman ............ G06Q 10/107 |

(Continued)

FOREIGN PATENT DOCUMENTS

EP    2 800 343 A1    11/2014

OTHER PUBLICATIONS

U. Steinhoff et al, The State of the Art in DNS Spoofing, 2012.*

(Continued)

*Primary Examiner* — Shanto M Abedin
(74) *Attorney, Agent, or Firm* — Harrington & Smith

(57) ABSTRACT

There are provided measures for enabling/realizing an integrity check of a DNS server setting, thereby enabling/realizing detection of DNS hacking or hijacking. Such measures could exemplarily include triggering a DNS resolution operation by a service device configured to provide a service using the DNS server setting, wherein the DNS server setting is used for DNS resolution or DNS forwarding in service provisioning, acquiring the IP address of a DNS server device, which is configured to perform DNS resolution in service provisioning, by reading the IP address of the DNS server device included in a DNS message as part of the triggered DNS resolution operation by the service device, and processing the acquired IP address of the DNS server device for evaluating integrity of the DNS server setting used in service provisioning.

16 Claims, 16 Drawing Sheets

(56) References Cited

U.S. PATENT DOCUMENTS

| | | | |
|---|---|---|---|
| 2007/0208869 A1* | 9/2007 | Adelman | G06Q 10/107 |
| | | | 709/229 |
| 2008/0028467 A1* | 1/2008 | Kommareddy | H04L 63/1458 |
| | | | 726/23 |
| 2008/0060054 A1* | 3/2008 | Srivastava | H04L 29/12066 |
| | | | 726/2 |
| 2008/0147837 A1* | 6/2008 | Klein | H04L 29/12066 |
| | | | 709/223 |
| 2009/0327487 A1 | 12/2009 | Olson et al. | 709/224 |
| 2013/0036466 A1* | 2/2013 | Penta | H04L 63/102 |
| | | | 726/22 |
| 2013/0198065 A1* | 8/2013 | McPherson | H04L 61/1511 |
| | | | 705/40 |
| 2014/0143875 A1* | 5/2014 | Tikkanen | G06F 21/56 |
| | | | 726/24 |
| 2016/0112284 A1* | 4/2016 | Pon | H04L 43/045 |
| | | | 709/224 |

OTHER PUBLICATIONS

Phishing Infrastructure Fluxes All the Way, D. Kevin Mcgrath et al, IEEE, 2009.*

Xin Hu et al, Accurate Real-time Identification of IP Prefix Hijacking, Proceedings of the 2007 IEEE Symposium on Security and Privacy, 2007.*

* cited by examiner

INTEGRITY CHECK OF DNS SERVER SETTING

FIELD

The present invention relates to an integrity check of a DNS server setting. More specifically, the present invention relates to measures (including methods, apparatuses and computer program products) for enabling/realizing an integrity check of a DNS server setting, thus detecting DNS hacking or hijacking.

BACKGROUND

In recent years, use of DNS (Domain Name System) has increasingly spread such that nowadays many services (including various protocols, applications, technologies etc.) are using the DNS for address resolution. That is, services using DNS rely on a valid DNS server setting for providing the service-requesting entity with appropriate functionalities, or the like. Accordingly, the DNS, particularly the DNS server setting, has become an attractive target for attacks on the proper functioning of such services using DNS. By way of manipulating the DNS server setting being utilized by a specific service for address resolution, an attacker tries to misdirect the service to a fraudulent address (instead of the actually intended address for service provisioning) without its knowledge or consent.

As one example scenario in this regard, attacks on users over the Internet have become popular, by which users are misdirected to fraudulent Web sites without their knowledge or consent. Such attacks are often referred to as "pharming" attacks.

In such pharming attacks, the DNS server setting is manipulated, which can generally be done at any point in the DNS resolving chain from the first DNS resolver to the root DNS server. For example, such pharming attacks can be implemented on a client device by locally manipulating the DNS server setting, or on some device keeping the DNS server setting, such as a DHCP (Dynamic Host Configuration Protocol) server device, by setting a rogue DNS server address.

That is, in a local network environment, the DNS server setting potentially being subject to such pharming attack can be configured in a client device or another local-area device such as a local-area DHCP server device like e.g. a router in the local network environment, e.g. a home or SOHO-type router, or a (wireless) base station or access point in the local network environment.

Herein, attacks on devices keeping a DNS server setting, such as DNS server devices (including DNS forwarder devices), are mainly addressed, including but not limited to DNS server devices (and DNS forwarder devices) in a local network environment. For example, local-area DHCP server devices typically grant IP (Internet Protocol) addresses to client devices and advertise default gateway addresses and DNS server addresses, and may comprise e.g. home routers, SOHO-type routes (SOHO: Small-Office, Home-Office), (wireless) base stations or access points, or any other type of network element including a DHCP server or a DHCP server functionality. When an attacker gains access to and spoofs such local-area DHCP server device, e.g. using a default password, a software vulnerability or the like, the attacker can change the device configuration or even patch his own software thereon, thereby manipulating the DNS server setting.

Typically, today there are (mainly) two ways on how attackers are trying to make money by hacking or hijacking a DNS server setting e.g. on DHCP server devices (while additional ways of making money by such attacks might still be conceivable): 1) attacks against online banking and 2) search hacking or hijacking. In both attacks, the attacker typically changes the DNS server address to be advertised over DHCP to point to a DNS server controlled by the attacker, or injects a local DNS server setting to a local DNS server (if such exists). By controlling where a specific URL (such as an URL for online-banking like e.g. myonlinebank.fi) points to, the attacker can perform a Man-in-the-Middle attack or set up a phishing site. By controlling search engine request or many other such pages, the attacker can change the online advertisement shown to the user to advertisements of his own and earn the affiliate revenue.

In practice, such pharming attacks on local-area devices such as local-area DHCP server devices, like home or SOHO pharming attacks, are feasible for various reasons. This is mainly because such local-area DHCP server devices like home and SOHO routers tend to be managed/administered in a less professional/expedient way than DHCP servers or routers in larger networks. Namely, such local-area DHCP server devices like home and SOHO routers are often old and not maintained properly, and they tend to have factory default passwords, a management interface open towards a local area network or the Internet, the possibility to change UPnP (Universal Plug-and-Play) settings even from the Internet-facing interface to allow traffic in, and so on. Further, such local-area DHCP server devices like home and SOHO routers typically have an operating system of some outdated version, such as e.g. an obsolete Linux version, which is no longer updated and hence subject to security vulnerabilities. In view thereof, integrity of local-area DNS server setting can be corrupted by way of malware in an infected local-area device or by an attacker from outside the local-area environment, i.e. from the Internet.

Thereby, for example, local-area network equipment including DHCP server devices represent an attractive target for pharming attacks and can quite easily be exploited for creating serious risks (by getting involved in a large-scale network of hacked/hijacked routers).

Such risks get even more aggravated by the situation that people managing/administering local-area network equipment including DHCP server devices are typically less experienced or even less qualified than professional system administrators responsible for network equipment including DHCP server devices in larger networks. That is, for average-skill people managing/administering local-area network equipment including DHCP server devices, it is very difficult, if not impossible, to check if their local-area DHCP server devices have been hacked/hijacked.

Similar principles as described above for pharming attacks in local network environments can be also adopted in any DNS-related attacks in different scenarios.

Accordingly, there is a demand to enable an integrity check of a DNS server setting, thus detecting DNS hacking or hijacking. Such integrity check should preferably be easy to use, without requiring specific system administration skills.

SUMMARY

Various exemplifying embodiments of the present invention aim at addressing at least part of the above issues and/or problems.

Various aspects of exemplifying embodiments of the present invention are set out in the appended claims.

According to an example aspect of the present invention, there is provided a method of checking integrity of a DNS server setting, comprising triggering a DNS resolution operation by a service device configured to provide a service using the DNS server setting, wherein the DNS server setting is used for DNS resolution or DNS forwarding in service provisioning, acquiring the IP address of a DNS server device, which is configured to perform DNS resolution in service provisioning, by reading the IP address of the DNS server device included in a DNS message as part of the triggered DNS resolution operation by the service device, and processing the acquired IP address of the DNS server device for evaluating integrity of the DNS server setting used in service provisioning.

According to an example aspect of the present invention, there is provided an apparatus, comprising a memory configured to store computer program code, and a processor configured to read and execute computer program code stored in the memory, wherein the processor is configured to cause the apparatus to perform: triggering a DNS resolution operation by a service device configured to provide a service using the DNS server setting, wherein the DNS server setting is used for DNS resolution or DNS forwarding in service provisioning, acquiring the IP address of a DNS server device, which is configured to perform DNS resolution in service provisioning, by reading the IP address of the DNS server device included in a DNS message as part of the triggered DNS resolution operation by the service device, and processing the acquired IP address of the DNS server device for evaluating integrity of the DNS server setting used in service provisioning.

According to an example aspect of the present invention, there is provided an apparatus comprising means for triggering a DNS resolution operation by a service device configured to provide a service using the DNS server setting, wherein the DNS server setting is used for DNS resolution or DNS forwarding in service provisioning, means for acquiring the IP address of a DNS server device, which is configured to perform DNS resolution in service provisioning, by reading the IP address of the DNS server device included in a DNS message as part of the triggered DNS resolution operation by the service device, and means for processing the acquired IP address of the DNS server device for evaluating integrity of the DNS server setting used in service provisioning.

According to an example aspect of the present invention, there is provided a computer program product comprising computer-executable computer program code which, when the computer program code is executed on a computer, is configured to cause the computer to carry out a method comprising: triggering a DNS resolution operation by a service device configured to provide a service using the DNS server setting, wherein the DNS server setting is used for DNS resolution or DNS forwarding in service provisioning, acquiring the IP address of a DNS server device, which is configured to perform DNS resolution in service provisioning, by reading the IP address of the DNS server device included in a DNS message as part of the triggered DNS resolution operation by the service device, and processing the acquired IP address of the DNS server device for evaluating integrity of the DNS server setting used in service provisioning.

According to an example aspect of the present invention, there is provided a computer program product comprising computer-executable computer program code which, when the program code is executed (or run) on a computer or the program is run on a computer (e.g. a computer of an apparatus according to any one of the aforementioned apparatus-related example aspects of the present invention), is configured to cause the computer to carry out the method according to the aforementioned method-related example aspect of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned example aspects of the present invention are set out herein with reference to the drawings and exemplifying embodiments of the present invention.

By way of exemplifying embodiments of the present invention, an integrity check of a DNS server setting is enabled/realized, thus enabling/realizing detection of DNS hacking or hijacking. Thereby, integrity of a DNS server setting used by any service in any scenario, can be checked without requiring specific system administration skills.

BRIEF DESCRIPTION OF THE DRAWINGS

In the following, the present invention will be described in greater detail by way of non-limiting examples with reference to the accompanying drawings, in which FIG. 1, comprising

DETAILED DESCRIPTION

Figure 1A:
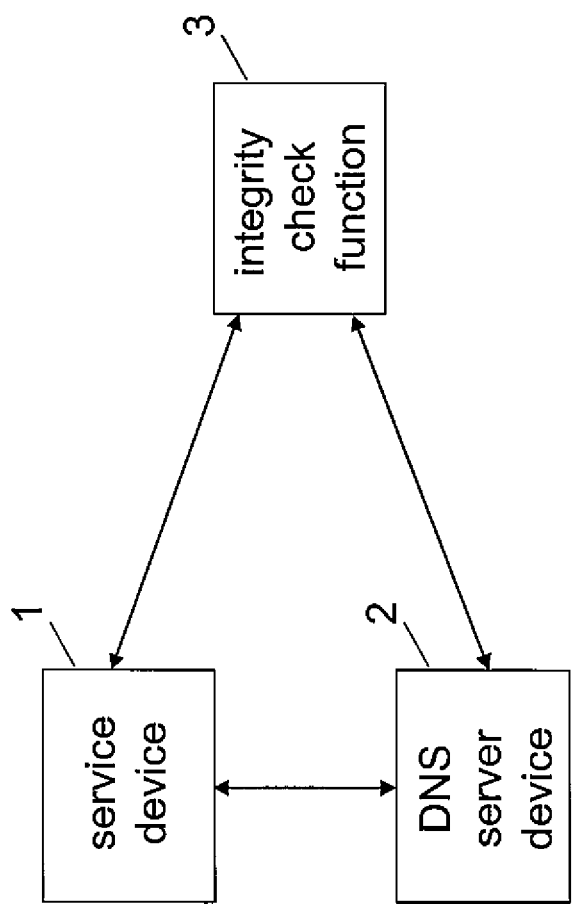
FIGS. 1A and 1B, shows schematic diagrams illustrating system configurations, for which exemplifying embodiments of the present invention are applicable.

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling/realizing an integrity check of a DNS server setting, thus enabling/realizing detection of DNS hacking or hijacking at any DNS server setting used by any service in any scenario.

FIG. 1A shows a schematic diagram illustrating a system configuration, for which exemplifying embodiments of the present invention are applicable.

As shown in FIG. 1A, exemplifying embodiments of the present invention generally relate to a basic system configuration in which a service device 1, a DNS server device 2 (which may be a recursive DNS server device) and an integrity check function 3 (being implemented by/at some device or combination/interworking of devices) are interconnected. The service device 1 generally represents any device (including standalone apparatuses and parts thereof) which is configured to provide at least one service to a service-requesting entity. Such service can be provided as or by any protocol, application, technology, or the like. The DNS server device 2 generally represents any device (including standalone apparatuses and parts thereof) which is configured to provide for DNS-based address resolution functionality. The service device 1 and the DNS server device 2 cooperate for realizing DNS-based address resolution for (provision of) the at least one service provided by the service device 1. The integrity check function represents any means (including standalone apparatuses and structural parts and/or functional parts (such as software) thereof) which is configured to check integrity of a DNS server setting.

In the present system configuration, a DNS resolution operation between the service device 1 and the DNS server device 2 is based on a direct connection there-between, i.e. a single link/hop for transmission of DNS messages (or, stated in other words, a single request for DNS resolution towards the DNS server device). The integrity check function 3 is configured to check integrity of a DNS server setting at the DNS server device 2 (wherein the DNS server setting at the DNS server device 2 is used by the service device 1 for (provision of) of its at least one service). That is, DNS hacking or hijacking at the DNS server device 2 can be checked in such system configuration.

Figure 1B:
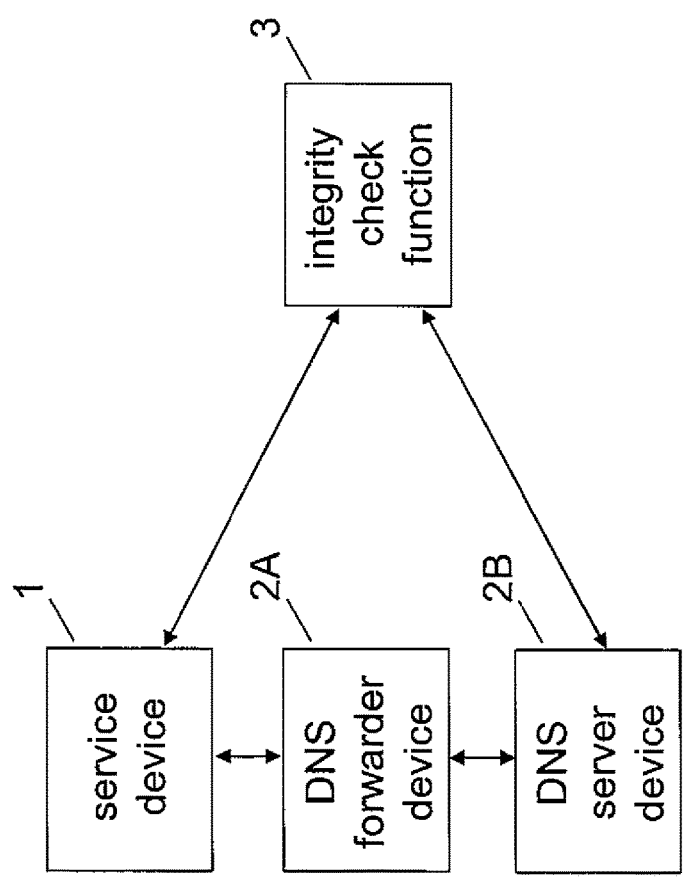

FIG. 1B shows a schematic diagram illustrating a system configuration, for which exemplifying embodiments of the present invention are applicable.

As shown in FIG. 1B, exemplifying embodiments of the present invention generally relate to a basic system configuration in which a service device 1, a DNS forwarder device 2A, a DNS server device 2B (which may be a recursive DNS server device) and an integrity check function 3 (being implemented by/at some device or combination/interworking of devices) are interconnected. The functionality of the service device, the DNS server device and the integrity check function are basically the same as in the system configuration of FIG. 1A, and reference is made to the above for details. As compared with the system configuration of FIG. 1A, the service device 1 and the DNS server device 2A cooperate, via the DNS forwarder device 2A, for realizing DNS-based address resolution for (provision of) the at least one service provided by the service device 1. Thereby, the DNS forwarder device 2A generally represents any device (including standalone apparatuses and parts thereof) which is configured to relay DNS messages in order to support DNS-based address resolution between the service device 1 and the DNS server device 2B. While only a single DNS forwarder device 2A is exemplarily illustrated, any number of DNS forwarder devices 2A may be involved in the DNS-based address resolution between the service device 1 and the DNS server device 2B.

In the present system configuration, a DNS resolution operation between the service device 1 and the DNS server device 2B is based on an indirect connection there-between via one or more DNS forwarder devices 2A, i.e. multiple links/hops for transmission of DNS messages (or, stated in other words, a chain of requests for DNS resolution towards the DNS server device). The integrity check function 3 is configured to check integrity of a DNS server setting at the DNS forwarder device 2A and/or the DNS server device 2B (wherein the DNS server setting at the DNS forwarder device 2A and/or the DNS server setting at the DNS server device 2B is/are used by the service device 1 for (provision of) of its at least one service). That is, DNS hacking or hijacking at any DNS forwarder device 2A and/or the DNS server device 2B can be checked in such system configuration.

According to exemplifying embodiments of the present invention, such basic system configuration can be implemented/realized in different situations, i.e. different scenarios, network topologies, system environments, or the like. Accordingly, depending on the underlying situation, the service device, the DNS server device, the DNS forwarder device (if any) and the integrity check function can be implemented/realized in different network elements or entities.

Although the service device, the DNS server device, the DNS forwarder device (if any) and the integrity check function are exemplarily illustrated as separate blocks, they can also be implemented/realized (at least partly) at the same network element or entity. For example, the service device and its related DNS server device (potentially including at least one related DNS forwarder device) can be collocated/integrated.

Generally speaking, assuming a simple system configuration including a client, a gateway and a server, the target/victim of DNS hacking or hijacking may be any one of these network elements or entities. When the integrity check function is implemented/realized at/on the client, potential DNS hacking or hijacking at/on, or affecting, the gateway and/or the server can be checked, or when the integrity check function is implemented/realized at/on the gateway, potential DNS hacking or hijacking at/on, or affecting, the client and/or the server can be checked, or when the integrity check function is implemented/realized at/on the server, potential DNS hacking or hijacking at/on, or affecting, the client and/or the gateway can be checked.

Just to mention some examples, the following examples are conceivable in this regard, while the present invention is not restricted thereto.

The service device can be (at/on) a client device (e.g. an end-user, a computer involved in a local-area network or a wide-area network connection, . . . ), a router device, a DHCP server device, a network access point (e.g. a (wireless) WLAN access point, a (wireless) base station, . . . ), any kind of server (e.g. a web server, a HTTP server, a SMTP server, an e-mail server, a closed subscriber group server (i.e. a server managing a closed subscriber group such as for a forum, an online shop, or the like), . . . ) representing an source point of service provisioning, any kind of proxy device (e.g. a web proxy, a HTTP proxy, a SMTP proxy, . . . ) representing an intermediate point of service provisioning, a Tor exit-node, a VPN (provider) exit node, or the like.

The service device can utilize any protocol, application, technology, or the like. For example, depending on the service being provided, an applicable protocol may be any one of HTTP (Hypertext Transfer Protocol), HTTPS (Hypertext Transfer Protocol Secure), RPC (Remote Procedure Call), SMTP (Simple Mail Transfer Protocol), TCP (Transmission Control Protocol), UDP (User Datagram Protocol) or any other protocol capable of transporting service-related traffic. For the purpose and applicability of the present invention, the kind of service actually (to be) provided and/or the underlying protocol, technology, etc. is not limited anyhow. Also, for the purpose and applicability of the present invention, the service can be provided to/for any conceivable application, including any communication-based application, any IoT (Internet-of-Things) application, or the like.

The integrity check function can be implemented/realized at/on any one of any kind of server (e.g. a web server, a HTTP server, a SMTP server . . . ) representing an target point of service provisioning, any kind of proxy device (e.g. a web proxy, a HTTP proxy, a SMTP proxy, . . . ) representing an intermediate point of service provisioning, an inline IDS (Intrusion Detection System) device representing an intermediate point of service provisioning for the purpose of intrusion detection, a client device (e.g. an end-user, a computer involved in a local-area network or a wide-area network connection, . . . ), or the like.

As some more specific but yet non-limiting examples for system configurations, for which exemplifying embodiments of the present invention are applicable, there is conceivable a scenario in which a client device and/or a router in a local network environment connects with a web server in the Internet (as described in detail below with reference to FIGS. 10 and 11) using a local DNS server, a scenario in which an email service is provided by an email server using a DNS server of the email server, a scenario in which a server managing a forum, an online shop, or the like and thus providing a corresponding service issues a registration confirmation email to a client device of a new user, any many more.

Figure 2:
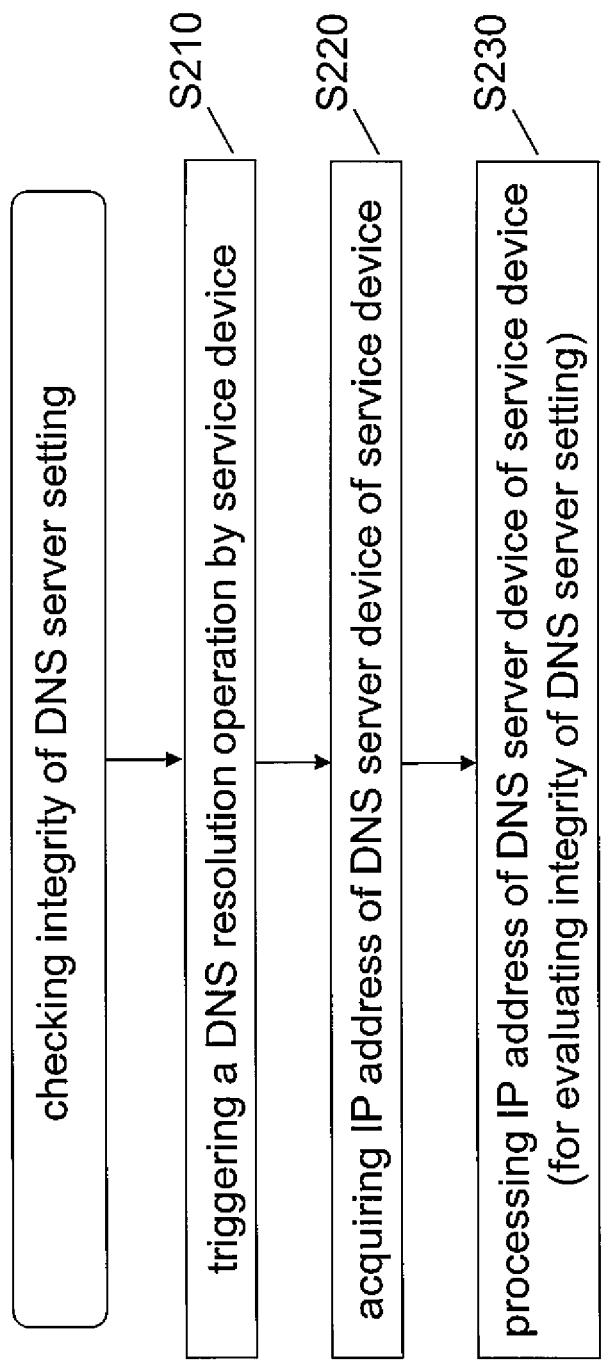
FIG. 2 shows a flowchart illustrating a method for checking integrity of a DNS server setting according to exemplifying embodiments of the present invention.

FIG. 2 shows a flowchart illustrating a method for checking integrity of a DNS server setting according to exemplifying embodiments of the present invention. The thus illustrated method may be generally executed by/at the integrity check function 3, and may be directed to check integrity of a DNS server setting of/at the DNS server device 2/2B and/or a DNS server setting of/at the DNS forwarder device 2A being used by the service device 1 for (provision of) the at least one service thereof, as illustrated in any one of FIGS. 1A and 1B above.

As shown in FIG. 2, a method for checking integrity of a DNS server setting according to exemplifying embodiments of the present invention comprises an operation (S210) of triggering a DNS resolution operation by a service device configured to provide a service using the DNS server setting, an operation (S220) of acquiring the IP address of a DNS server device, which is configured to perform DNS resolution in service provisioning, by reading the IP address of the DNS server device included in a DNS message as part of the triggered DNS resolution operation by the service device, and an operation (S230) of processing the acquired IP address of the DNS server device.

It is noted that the DNS server setting to be checked is used for DNS resolution in service provisioning when it is a DNS server setting of/at a DNS server device, while the DNS server setting to be checked is used for DNS forwarding in service provisioning when it is a DNS server setting of/at a DNS forwarder device. Further, it is noted that the acquired IP address of the DNS server device can be particularly processed for evaluating integrity of the DNS server setting used in service provisioning, as exemplified hereinafter. Still further, it is noted that the DNS message, from which the IP address of the DNS server device is read, can be any DNS message in the context/transaction of the triggered DNS resolution operation, namely a DNS request and/or a DNS reply, as exemplified hereinafter, as long as these are associated by way of the same transaction identifier or the like.

According to exemplifying embodiments of the present invention, the DNS resolution operation by a service device can be triggered in different ways. For example, such DNS resolution operation can be triggered internally (automatically) at the entity performing the security/integrity check, such DNS resolution operation can be triggered externally (explicitly or implicitly) from outside the entity performing the security/integrity check, or the like. Specifically, the DNS resolution operation according to exemplifying embodiments of the present invention can refer to a domain name of a domain or sub-domain hosted by or under control of an integrity check device or an IP address of an integrity check device in service-related traffic. If so, the entity performing the security/integrity check can automatically connect to a corresponding sub-/domain or IP address, i.e. a (authoritative DNS server device for DNS resolution thereof), e.g. based on some default pre-/configuration or setting, or the entity performing the security/integrity check can be triggered to connect to a corresponding sub-/domain or IP address, i.e. a (authoritative DNS server device for DNS resolution thereof), e.g. based on injection of such trigger in service-related traffic, or the like.

Figure 3:
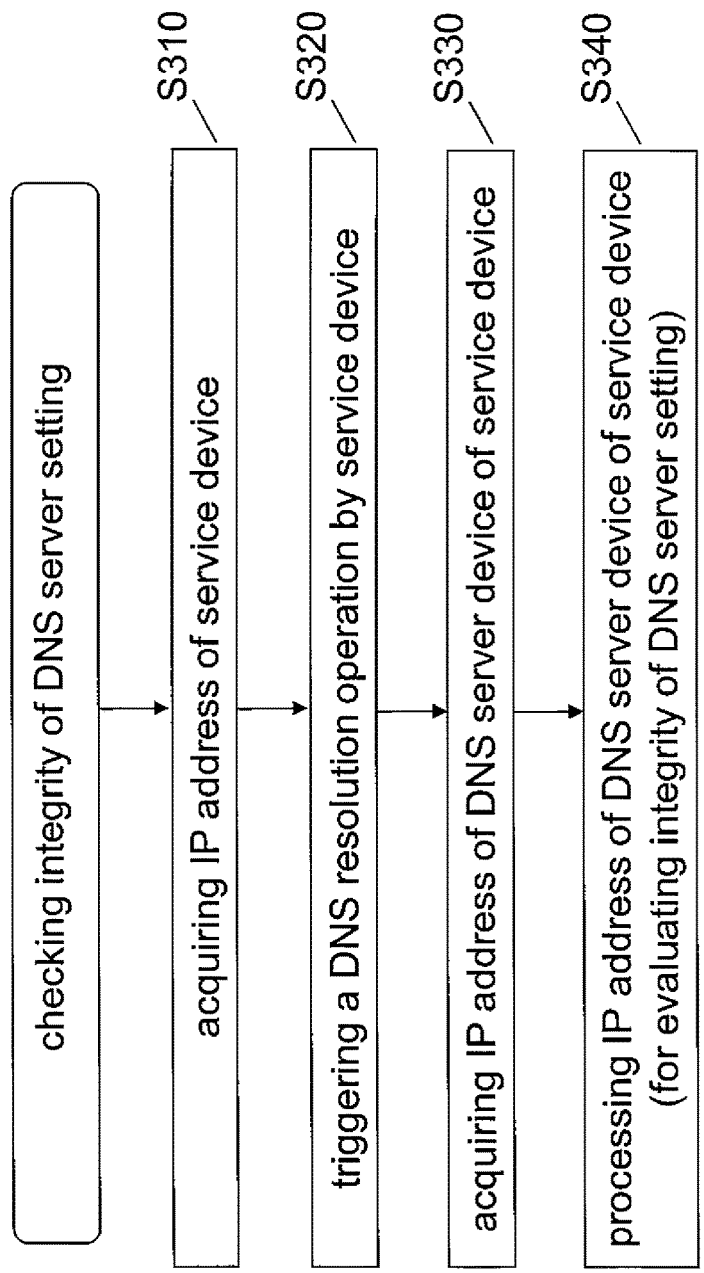
FIG. 3 shows a flowchart illustrating another method for checking integrity of a DNS server setting according to exemplifying embodiments of the present invention.

FIG. 3 shows a flowchart illustrating another method for checking integrity of a DNS server setting according to exemplifying embodiments of the present invention. The thus illustrated method may be generally executed under the same conditions as the method of FIG. 2, as described above.

In the method of FIG. 3, the operations S320, S330 and S340 basically correspond to the operations S210, S220 and S230 in the method of FIG. 2, respectively. Accordingly, reference is made to the description of FIG. 2 for details thereof, while a redundant description thereof is omitted.

As shown in FIG. 3, a method for checking integrity of a DNS server setting according to exemplifying embodiments of the present invention may additionally comprise an operation (S310) of acquiring the IP address of the service device. The thus acquired IP address of the service device can then be used in the subsequent operation of triggering a DNS resolution operation by the service device configured to provide a service using the DNS server setting.

As a part of the processing/evaluation operation or based thereon, a method for checking integrity of a DNS server setting according to exemplifying embodiments of the present invention may also comprise an operation (not illustrated) of collecting statistical data with regard to usage of DNS server devices and/or DNS forwarder devices by service devices and/or potential integrity issues relating to the DNS server device of the service device. That is, a statistical analysis can be made using any previously acquired information. Also, further useful information for purposes of informing a user, client or service devices in this regard can be stored/processed/retrieved either locally or remotely with respect to the entity performing the evaluation, i.e. the integrity check function, such as e.g. information about the location of DNS server devices, the owners/operators of DNS server devices, or the like.

Such statistical data and/or further useful information can be provided, e.g. together with an evaluation result on DNS server setting integrity, to the service device requesting the integrity/security check and, thus, to the user thereof. Based thereon, the user can for example be informed about any relative or absolute measure as well as further information, which could be indicative of DNS server setting integrity, e.g. that "100% or 100'000 of other customers of the same ISP you are using use the IP address x.x.x.x as their DNS server. That DNS server is located in Finland. You seem to be using the IP address y.y.y.y as DNS server, and it is located in China." Such information (in addition to the evaluation result on DNS server setting integrity) can let the user know (more/better) about the prevailing integrity/security situation in terms of the DNS server setting used by the user, i.e. the service device.

Figure 4:
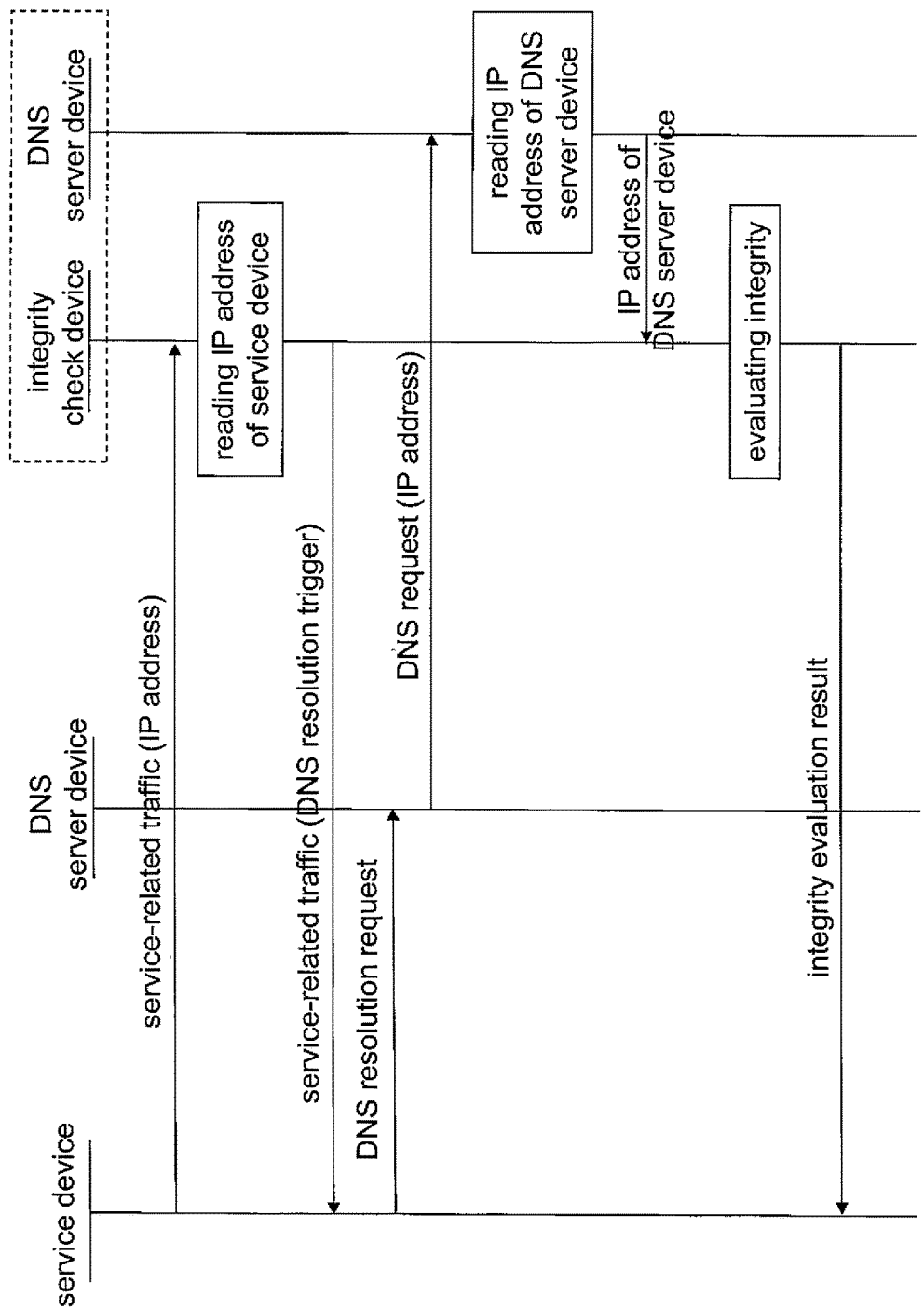
FIG. 4 shows a diagram illustrating a procedure for checking integrity of a DNS server setting according to exemplifying embodiments of the present invention.

FIG. 4 shows a diagram illustrating an example of a procedure for checking integrity of a DNS server setting according to exemplifying embodiments of the present invention.

The example system configuration underlying the thus illustrated procedure basically corresponds to the system configuration of FIG. 1A, and it is assumed that the integrity check function according to exemplifying embodiments of the present invention is implemented/realized by/at an integrity check device and a DNS server device related thereto (serving as an authoritative DNS server device). The integrity check device and its related DNS server device can be collocated/integrated (as indicated by a dashed box) or separated.

According to exemplifying embodiments of the present invention, the integrity/security check together with the functionality of providing an integrity/security evaluation result, i.e. an indication of whether or not the service device is affected by DNS hacking or hijacking (in its DNS server device used for service provisioning), is accomplished by or under control of the integrity check device.

When the service device communicates service-related traffic including its IP address, and the integrity check device is able to listen to this service-related traffic (e.g. as an intermediate device on the communication path, such as a proxy, or a destination device, such as a server), the integrity check device can read the IP address of the service device. That is, the integrity check device is configured to read the IP address included in service-related traffic from the service device.

Further, the integrity check device can read the IP address of the DNS server device. That is, the integrity check device is configured to trigger a DNS resolution operation by the service device, and to read the IP address of the DNS server device included in a DNS message as part of the triggered DNS resolution operation by the service device, namely a DNS request from the DNS server device used by the service device to the DNS server device related to the integrity check device or a DNS reply from the DNS server device related to the integrity check device to the DNS server device used by the service device.

More specifically, when the integrity check device has received service-related traffic from the service device, it is able to respond thereto, e.g. by communicating service-related traffic to the service device. In such responding service-related traffic, the integrity check device may inject a DNS resolution trigger, which triggers the service device to issue a DNS resolution request to its related DNS server device (in the case of the system configuration of FIG. 1B, via at least one DNS forwarder device (not shown here)), thus causing the DNS server device used by the service device to issue a DNS request, which includes its IP address, to the DNS server device related to the integrity check device, for requesting resolution of the injected DNS resolution trigger. That is, the DNS resolution trigger is to be injected such that it can be communicated from the integrity check function to the service provider (and to its related DNS server device) either directly or indirectly.

According to exemplifying embodiments of the present invention, the injected DNS resolution trigger may be either a domain name of a domain or sub-domain hosted by or under control of the integrity check device or an IP address of the integrity check device. Then, the service device requires resolving of the thus received domain name or IP address for service provisioning. Such required resolving is requested by the DNS server device used by the service device. That is, the DNS server device used by the service device does not known the proper domain name/IP address mapping, and thus requests the DNS server device related to the integrity check device transmitting such DNS resolution trigger for resolution thereof. More specifically, the DNS server device used by the service device either requests resolution of the injected domain name into an IP address of the integrity check device or requests resolution of the injected IP address of the integrity check device into a domain name of a domain or sub-domain hosted by or under control of the integrity check device.

From such DNS request, the DNS server device related to the integrity check device can read the IP address of the DNS server device used by the service device. Then, if not collocated/integrated anyway, the DNS server device related to the integrity check device can provide the read IP address of the DNS server device to its integrity check device.

As mentioned above, injecting a DNS resolution trigger in service-related traffic is only one possibility for triggering the DNS resolution operation by the service device. For example, the service device and/or the DNS server device used by the service device may be pre-configured to enable a corresponding DNS resolution operation, as outlined hereinafter, even without such external traffic-based injection trigger.

According to exemplifying embodiments of the present invention, the DNS resolution operation may refer to some unique data instance, i.e. some data instance which is unique for the ongoing DNS resolution operation which has been triggered for acquiring the IP address of the DNS server device used by the service device (and thus capable of distinguishing different, potentially parallel, DNS resolution operations from each other). Such unique data instance may serve as sort of (session) token, and for example be any kind of secret which may be predetermined, random, pseudo-random or the like. Specifically, the DNS resolution operation may refer to a uniquely determined (i.e. specified or generated) domain or sub-domain hosted by or under control of the integrity check device. Generally speaking, the uniquely determined (i.e. specified or generated) domain or sub-domain may relate to any resource hosted by or under control of the integrity check device. Thereby, when receiving the DNS request from the DNS server device used by the service device (or an information thereof), the DNS server device related to the integrity check device (or the integrity check device itself) can not only read its IP address but can also verify the relation between the previously acquired IP address of the service device and the recently acquired IP address of the DNS server device used by the service device. Namely, when the DNS resolution trigger is uniquely determined, the DNS server device related to the integrity check device (or the integrity check device itself) is able to recognize to which DNS resolution trigger the present DNS query refers. Together with the knowledge of the (IP address of the) service device to which the DNS resolution trigger has been sent, a definite relation between the involved entities, i.e. the service device and its related/used DNS server device, or their IP addresses, can be established. Thereby, it can be ensured that the subsequent integrity evaluation is appropriate because of being based on (at least) the IP address of the DNS server device whose DNS server setting is used in service provisioning.

As described above, establishing a relation between the involved entities or their IP addresses can be accomplished by a DNS resolution trigger which may trigger either a DNS lookup (i.e. domain name→IP address resolution) or a reverse DNS lookup (i.e. IP address→domain name resolution). Depending on the kind of DNS resolution trigger, the DNS server device related to the integrity check device has to have normal or reverse DNS records in order to enable the thus requested lookup operation.

For example, for reverse DNS lookup, a reverse DNS record for the IP address of the integrity check device can be created, and (service-related) traffic can be generated, which is processed or intercepted by some application. When knowing the IP address of the device where that application is running, it can be checked whether or not it is subject to DNS hacking or hijacking. In such reverse DNS lookup, it might be effective to change the reverse DNS record for each integrity/security test. Further, it might be effective to set the time-to-live value for the reverse DNS record to 0 in order to force all devices that do the reverse DNS lookup query to contact the DNS server related to the integrity check device and to prevent them from receiving the result from a cache of some other DNS server.

The reverse DNS lookup can be effective for integrity/security checking at/by an entity implementing/realizing IP tracking. For example, a server managing a forum, an online shop, or the like may incorporate an IP tracking function/software doing reverse IP lookup for user's IP addresses, such as e.g. "phpBB". Namely, "phpBB" is a popular forum software which supports different kinds of add-on modules including an "IP Tracking" module which logs and tells the administrator of the forum how the forum is being used by users (for example, what IP addresses and usernames the users are using for accessing different topics of the forum), and which also supports doing reverse IP lookup for the forum users' IP addresses. So, when the service device is such a server incorporate an IP tracking function/software, performing reverse DNS lookup for the integrity check devices' IP address (e.g. injected as a DNS resolution trigger), enables the DNS server device related to the integrity check device to get the IP address of the DNS server device such server is using.

Yet, the present invention is not restricted to the above-outlined approach for establishing a relation between the involved entities or their IP addresses. Rather, any conceivable method for establishing such relationship is equally applicable according to exemplifying embodiments of the present invention.

Based on the acquired IP addresses, the integrity check device can then perform the integrity evaluation of the DNS server setting used in service provisioning on the basis of the IP address of the DNS server device used by the service device or both the IP address of the DNS server device used by the service device and the IP address of the DNS server device related to the integrity check device, as exemplified hereinafter. Then, the integrity check device can provide the service device with the integrity/security evaluation result, possibly together with locally and/or remotely collected/analyzed statistical data with regard to usage of DNS server devices (and/or DNS forwarded devices in the case of the system configuration of FIG. 1B) by service devices and/or potential integrity issues relating to the DNS server device used by the service device. As indicated above, depending on the case, the evaluation result can be an indication of whether or not the service device is affected by DNS hacking or hijacking.

As mentioned above, such DNS hacking or hijacking, which could be evaluated in the above-described procedure, can take place in the DNS server device used for service provisioning in the case of the system configuration of FIG. 1A, or in the DNS server device and/or any DNS forwarder device used for service provisioning in the case of the system configuration of FIG. 1B.

Although not illustrated in FIG. 4, in response to the DNS request, the DNS server device related to the integrity check device carries out the requested DNS resolution and provides the DNS resolution result (i.e. the resolved IP address corresponding to the requested domain name or the resolved domain name corresponding to the requested IP address) to the DNS server device used by the service device. Then, the DNS server device used by the service device can provide this DNS resolution result to the requesting service device, thus completing the triggered DNS resolution by the service device. Based on this DNS resolution result, the service device can then continue providing its actual service.

Apart from the DNS request, as described above, the DNS server device related to the integrity check device can read the IP address of the DNS server device used by the service device also from such DNS reply, namely a DNS request for providing the requested DNS resolution of the (e.g. injected) domain name into an IP address of the integrity check device or the requested DNS resolution of the (e.g. injected) IP address of the integrity check device into a domain name of a domain or sub-domain hosted by or under control of the integrity check device, which DNS reply is sent from the DNS server device related to the integrity check device to the DNS server device used by the service device. If not collocated/integrated anyway, the DNS server device related to the integrity check device can provide the read IP address of the DNS server device to its integrity check device.

According to exemplifying embodiments of the present invention, any conceivable method for evaluating integrity of a DNS server setting can be adopted. In the following, some examples form such integrity evaluation are described in more detail for illustrative purposes, yet without restricting the present invention to the application of any one of the thus illustrated examples.

Figure 5:
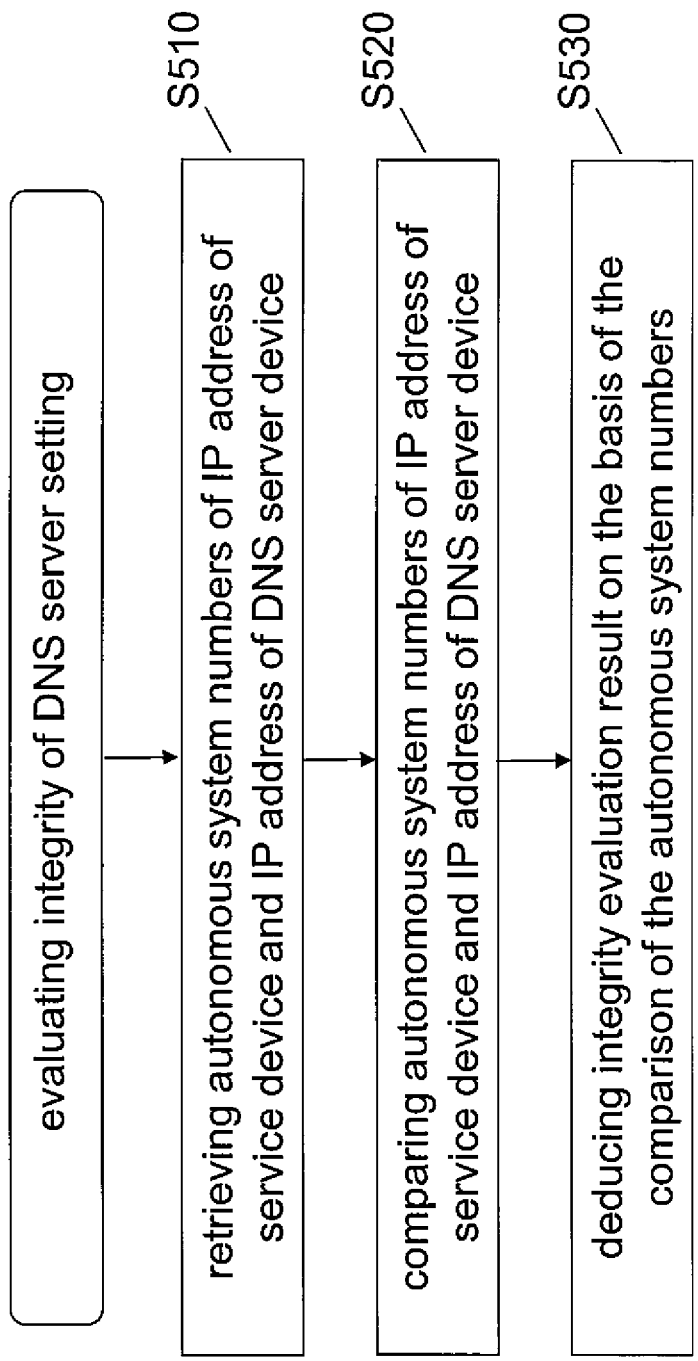
FIGS. 5 to 9 show flowcharts illustrating various methods for evaluating integrity of a DNS server setting according to exemplifying embodiments of the present invention.

FIG. 5 shows a flowchart illustrating a first example of a method for evaluating integrity of a DNS server setting according to exemplifying embodiments of the present invention. The thus illustrated method of FIG. 5 may be applied for integrity evaluation in operation S340 of FIG. 3.

As shown in FIG. 5, a method for evaluating integrity of a DNS server setting according to exemplifying embodiments of the present invention comprises an operation (S510) of retrieving the autonomous system number (ASN) of the acquired IP address of the service device and the autonomous system number (ASN) of the acquired IP address of the DNS server device, and an operation (S520) of comparing the retrieved autonomous system numbers (ASNs). Based on the ASN comparison, an integrity evaluation result can be deduced (in operation S530).

In the comparing operation, the ASNs being compared can be previously registered, e.g. as a result of former integrity/security checks and thus retrieved from a local or remote database. Additionally or alternatively, the ASNs being compared can be retrieved by way of an inquiry/response (or query/response) operation, as explained below. Anyway, ASNs of IP addresses of related devices are to be compared, i.e. the IP address of the service device using the DNS server setting and the IP address of the related DNS server device, and further details in this regard are explained below.

In the present example of integrity evaluation, the ASN of the IP address of the service device and the ASN of the IP address of the related DNS server device are compared with each other, since these ASNs should normally be the same. Normally, both IP addresses should belong to the same Autonomous System Number (ASN), such as the same Internet Service Provider (ISP). If e.g. the DNS server device used by the service device has a different ASN or belongs to a different ISP as the service device, this is an indication that DNS hacking or hijacking is in progress, e.g. a pharming attack is being carried out on the DNS server device (or a related DNS forwarder device), thus affecting the service device.

Therefore, in the present example of integrity evaluation, the integrity of the DNS server setting is evaluated to be violated, or the security is evaluated to be compromised or at least jeopardized, when the ASN of the IP address of the service device differs from the ASN of the IP address of the DNS server device used by the service device, while the integrity of the DNS server setting is evaluated to be observed, or the security is evaluated to be ensured, when the ASN of the IP address of the service device is equal or corresponds to the ASN of the IP address of the DNS server device used by the service device.

However, there are cases in which the ASN of the IP address of the service device and the ASN of the IP address of the DNS server device used by the service device could be different without being due to DNS hacking or hijacking, e.g. a pharming attack affecting the service device. Namely, it may be the case that both IP addresses could normally belong to different Autonomous System Numbers (ASNs), such as different Internet Service Providers (ISPs). An example case, in which the DNS server device used by the service device can normally have a different ASN or belong to a different ISP as the service device itself, can be the usage of Google's DNS server. This is because Google is providing a DNS server with the IP address 8.8.8.8, which is usable by anyone anywhere, and many users also use it. So, if the acquired IP address of the DNS server is 8.8.8.8, then this is not necessarily an indication that DNS hacking or hijacking is in progress, i.e. a pharming attack affecting the service device is being carried out. Rather, from such comparison result, it cannot be (finally/certainly) known whether or not DNS hacking or hijacking is in progress, i.e. a pharming attack is being carried out on the DNS server device (or a related DNS forwarder device), thus affecting the service device.

Therefore, in the present example of integrity evaluation, the integrity of the DNS server setting is evaluated to be unknown when the ASN of the IP address of the service device differs from the ASN of the IP address of the DNS server device used by the service device, and the IP address of the DNS server device used by the service device corresponds to an IP address of a commonly known DNS server. For facilitating such evaluation result, the entity performing the evaluation has to have knowledge about commonly known DNS server devices and their IP addresses. Namely, IP addresses of commonly known DNS server devices, such as the aforementioned Google's DNS server have to be pre-registered, e.g. in a DNS server database which is located at or accessible by the entity performing the evaluation, i.e. the integrity check function. This is for example the case when the evaluation is performed by the operator of such commonly known DNS server device as such, e.g. by Google.

In case the evaluation is performed by the operator of such commonly known DNS server device, an unknown evaluation result could be avoided, and it could always be achieved an evaluation result providing a clear indication of whether or not DNS hacking or hijacking is in progress, i.e. a pharming attack is being carried out on the DNS server device (or a related DNS forwarder device), thus affecting the service device. This is further explained in connection with the exemplary scenario of FIG. 10 below.

As mentioned above, statistical data can be collected in the context of an integrity check/evaluation according to exemplifying embodiments of the present invention. In the present example of integrity evaluation, statistical data with regard to usage of DNS server devices and/or DNS forwarder devices by service devices with a corresponding autonomous system number of their IP addresses and/or potential integrity issues relating to the DNS server device of the service device can be collected and stored/processed. That is, a statistical analysis for respective ASNs and/or ISPs can be made using the previously acquired information. For example, it can be collected and analyzed what kind of DNS server devices' IP addresses are used by/in a respective ISP/ASN, i.e. user, client or service devices belonging to the respective ISP/ASN. Such statistical data can be stored/processed either locally at the entity performing the evaluation, i.e. the integrity check function, or can be stored/processed at some other entity/database accessible by the entity performing the evaluation, i.e. the integrity check function. Also, further useful information for purposes of informing a user, client or service devices in this regard can be stored/processed/retrieved either locally or remotely with respect to the entity performing the evaluation, i.e. the integrity check function, such as e.g. information about the location of DNS server devices, the owners/operators of DNS server devices, or the like.

As indicated above, in case the integrity/security check according to exemplifying embodiments of the preset invention is implemented by the operator of an own and/or commonly known DNS server device, an unknown evaluation result could be avoided, and it could always be achieved an evaluation result providing a clear indication of whether or not DNS hacking or hijacking is in progress, e.g. a pharming attack is being carried out affecting the service device. For example, if Google implemented such functionality as described herein, they could use their own DNS server with the IP address 8.8.8.8 for this purpose, and this would mean that in all cases a definite answer of whether or not a service device is being affected by DNS hacking or hijacking can be obtained. This is because Google, as the operator of their own DNS server (which is a commonly known DNS server as well), would see the IP address, from which the DNS request to their DNS server's IP address 8.8.8.8 is originated, and could thus deduce that, if this originating IP address was from a different ASN than the service devices' IP address, the service device is affected by DNS hacking or hijacking.

Figure 6:
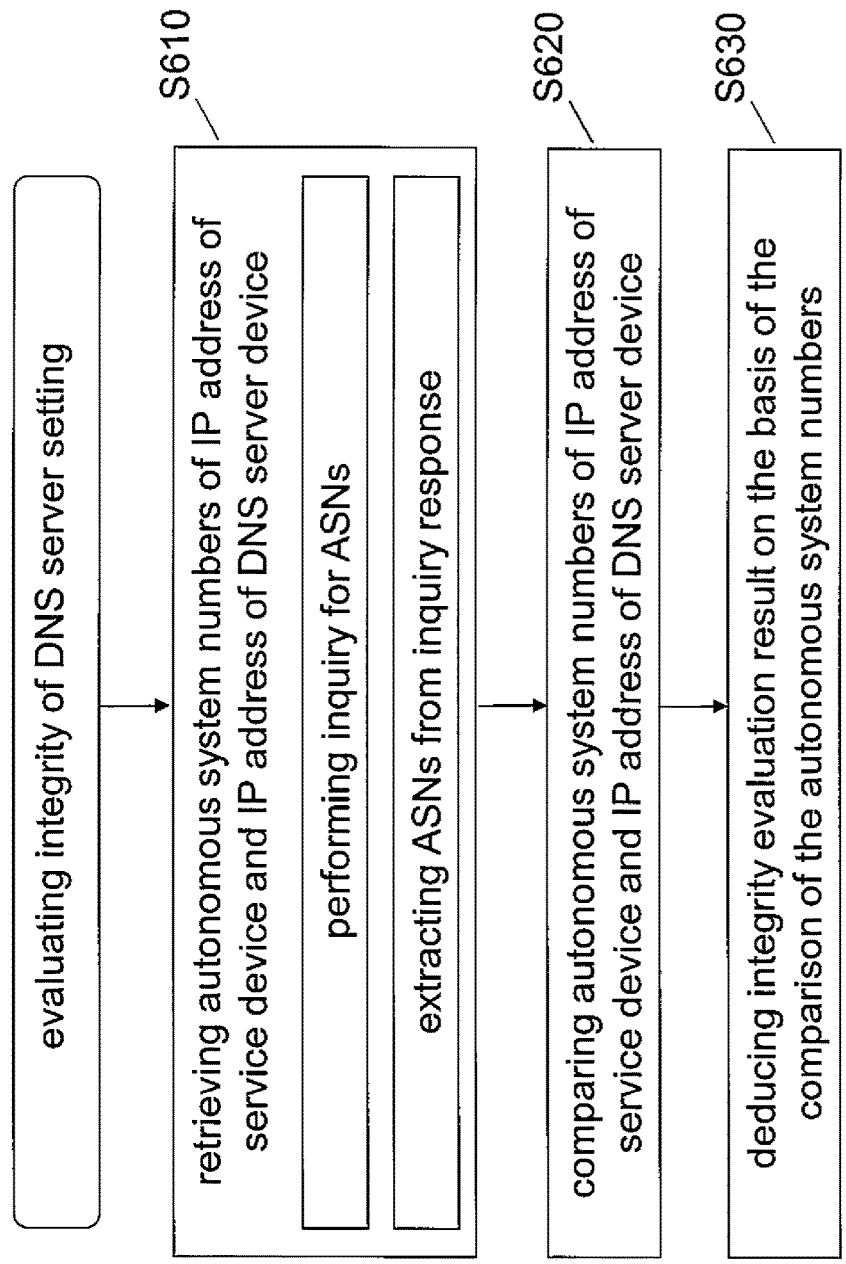

FIG. 6 shows a flowchart illustrating a second example of a method for evaluating integrity of a DNS server setting according to exemplifying embodiments of the present invention. The thus illustrated method of FIG. 6 may be applied for integrity evaluation in operation S340 of FIG. 3.

In the method of FIG. 6, the operations S610, S620 and S630 basically correspond to the operations S510, S520 and S530 in the method of FIG. 5, respectively. Accordingly, reference is made to the description of FIG. 5 for details thereof, while a redundant description thereof is omitted.

As shown in FIG. 6, in a method for evaluating integrity of a DNS server setting according to exemplifying embodiments of the present invention, the ASN retrieving operation (S610) may comprise an operation of performing an inquiry (or query) for the autonomous system numbers (ASNs) using the acquired IP address of the service device and the acquired IP address of the DNS server device, and comprise an operation of extracting the autonomous system number (ASN) of the acquired IP address of the service device and the autonomous system number (ASN) of the acquired IP address of the DNS server device from an inquiry (or query) response.

According to exemplifying embodiments of the present invention, the ASNs can be retrieved using a standardized protocol, such as the WHOIS protocol as specified in RFC3912. That is, the inquiry (or query) may be performed and the inquiry (or query) response may be received in accordance with the WHOIS protocol, and the inquiry (or query) response may comprise a WHOIS record for the IP address of the service device and a WHOIS record for the IP address of the DNS server device. Such inquiry/response (or query/response) operation, e.g. according to the WHOIS protocol, can be carried out between the entity performing the method, i.e. the integrity check function, and a dedicated entity, such as a local and/or remote ASN database.

On the basis of such inquiry/response (or query/response) operation, a WHOIS record comparison for the IP address of the service device (e.g. the public IP address of a client device which should be the same as public IP address of the client device's router when the user (e.g. a user's local network environment) is behind a Network Address Translator (NAT), and the IP address of the DNS server device, the service device is using. As indicated above, both IP addresses should normally belong to the same ISP or more specifically to the same ASN.

In the following, an example is given for a case in which the service device's or user's IP address 213.157.89.153 belongs to AS29422, and the DNS server device's IP address 217.30.180.230 belongs to the same AS29422, thus indicating that DNS hacking or hijacking is not in progress.

IP address of DNS server:
217.30.180.230
WHOIS record of DNS server:
IP Location: Finland Finland Helsinki Nebula Oy. Web Hosting Pri-dns And Streaming
ASN: Finland AS29422 NBLNETWORKS-AS Nebula Oy, FI (registered Sep. 4, 2003)
inetnum: 217.30.180.0-217.30.180.255
netname: NEBULA-1
remarks: INFRA-AW
descr: Nebula Oy. Web hosting, pri-DNS and streaming.
country: FI
admin-c: NBL4-RIPE
tech-c: NBL4-RIPE
status: ASSIGNED PA
mnt-by: NBL-MNT
source: RIPE
changed: 20061116
IP address of service device or user:
213.157.89.153
WHOIS record of user:
IP Location: Finland Finland Helsinki Nebula Oy Xdsl Routing Block
ASN: Finland AS29422 NBLNETWORKS-AS Nebula Oy, FI (registered Sep. 4, 2003)
inetnum: 213.157.89.0-213.157.89.255
netname: NEBULADSL-RTR3
descr: Nebula Oy xDSL routing, block 4
remarks: INFRA-AW
country: FI
admin-c: NBL4-RIPE
tech-c: NBL4-RIPE
status: ASSIGNED PA
mnt-by: NBL-MNT
source: RIPE
changed: 20081006

Figure 7:
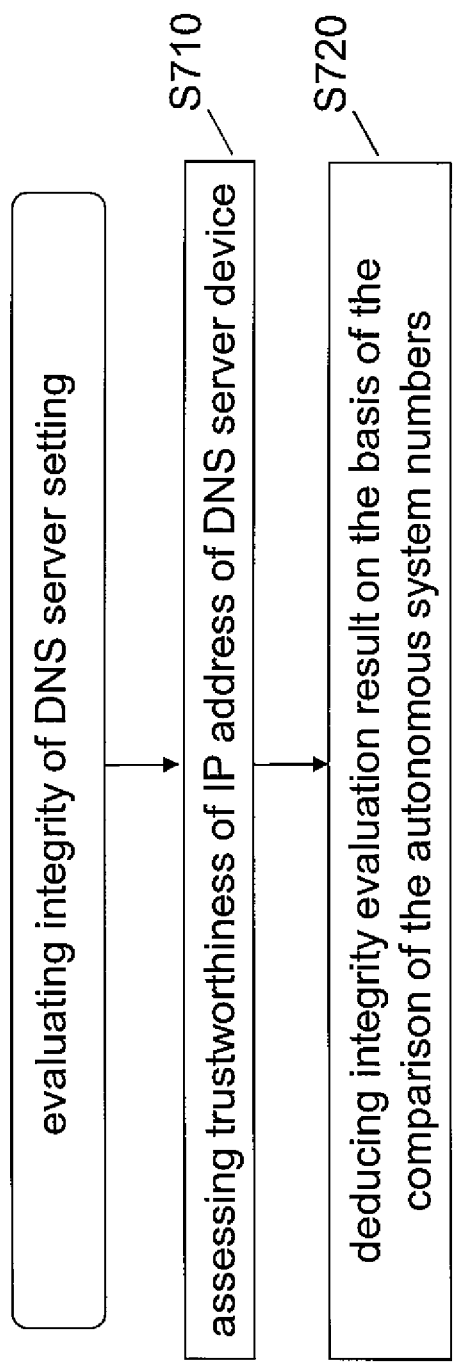

FIG. 7 shows a flowchart illustrating a third example of a method for evaluating integrity of a DNS server setting according to exemplifying embodiments of the present invention. The thus illustrated method of FIG. 7 may be applied for integrity evaluation in operation S230 of FIG. 2 and operation S340 of FIG. 3, respectively.

As shown in FIG. 7, a method for evaluating integrity of a DNS server setting according to exemplifying embodiments of the present invention comprises an operation (S710) of assessing trustworthiness of the acquired IP address of the DNS server device. Based on the trustworthiness assessment, an integrity evaluation result can be deduced (in operation S720).

Basically, in the present example of integrity evaluation, the integrity of the DNS server setting is evaluated to be violated, or the security is evaluated to be compromised or at least jeopardized, when the acquired IP address of the DNS server device is evaluated to be not trustworthy/trusted, while the integrity of the DNS server setting is evaluated to be observed, or the security is evaluated to be ensured, when the acquired IP address of the DNS server device is evaluated to be trustworthy/trusted.

Figure 8:
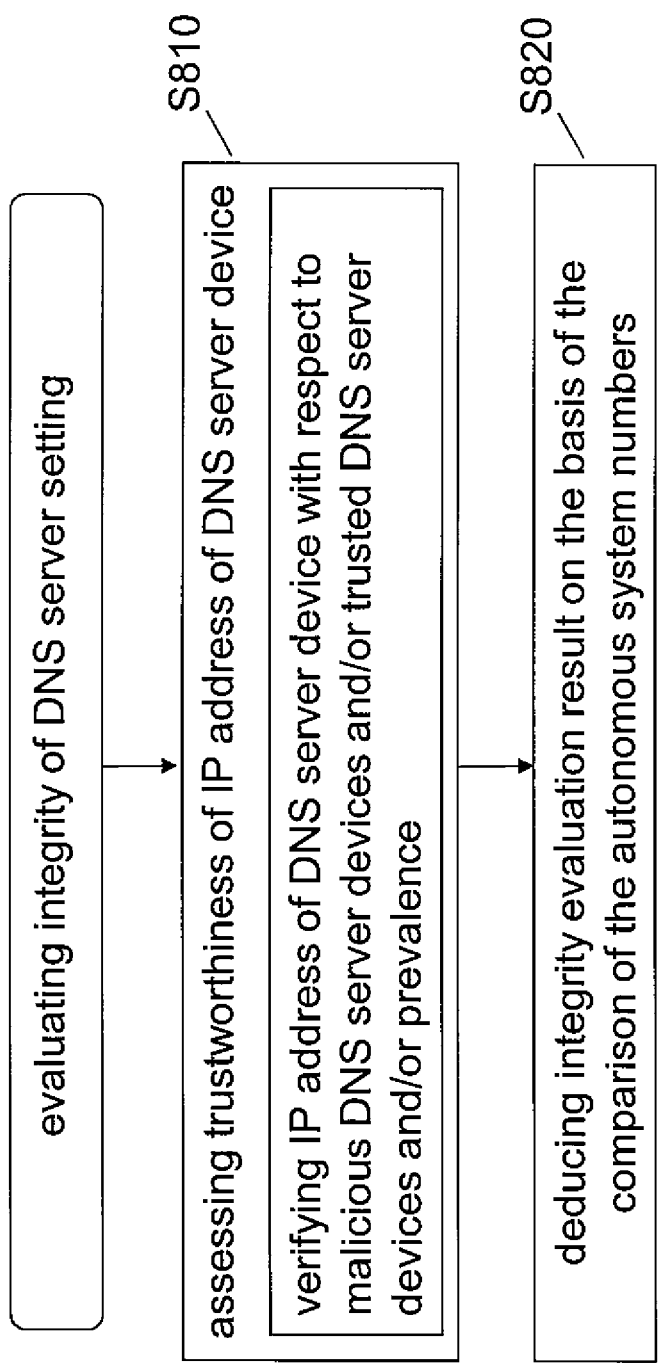

FIG. 8 shows a flowchart illustrating a fourth example of a method for evaluating integrity of a DNS server setting according to exemplifying embodiments of the present invention. The thus illustrated method of FIG. 8 may be applied for integrity evaluation in operation S230 of FIG. 2 and operation S340 of FIG. 3, respectively.

In the method of FIG. 8, the operations S610 and S820 basically correspond to the operations S710 and S720 in the method of FIG. 7, respectively. Accordingly, reference is made to the description of FIG. 7 for details thereof, while a redundant description thereof is omitted.

As shown in FIG. 8, in a method for evaluating integrity of a DNS server setting according to exemplifying embodiments of the present invention, the trustworthiness assessment operation (S810) may comprise an operation of verifying the acquired IP address of the DNS server device with respect to malicious DNS server devices (i.e. a blacklist) and/or trusted DNS server devices (i.e. a whitelist) and/or prevalence. More specifically, such verification operation may comprise one or more of verifying whether the acquired IP address of the DNS server device is included in a list of IP address of malicious DNS server devices (i.e. a blacklist), verifying whether the acquired IP address of the DNS server device is included in a list of IP address of trusted DNS server devices (i.e. a whitelist), and verifying whether the acquired IP address of the DNS server device is prevalent on the basis of a frequency and/or number of previous acquisitions of the acquired IP address of the DNS server device. Any such verification can be accomplished by using a local and/or remote list/database, respectively.

As regards a malicious state verification, the acquired IP address of the DNS server device can be compared/looked up with/in a list of (knowingly) malicious DNS server devices (i.e. a blacklist). As regards a trusted state verification, the acquired IP address of the DNS server device can be compared/looked up with/in a list of (knowingly) trusted DNS server devices (i.e. a whitelist). Such blacklist-based and whitelist-based verifications can be carried out alone or in combination. As regards a prevalence state verification, a database of frequency and/or number of previous acquisitions of IP addresses (of DNS server devices) can be looked up with the acquired IP address of the DNS server device. Such lookup yields how many frequently and/or often the acquired IP address of the DNS server device has been detected before (e.g. in a predetermined time period before the actual time), and such frequency and/or number can be compared with a predefined threshold for differentiating between a malicious state and trusted state. For example, when the database lookup yields that the acquired IP address of the DNS server device has been acquired less than 50 times (e.g. in the last month), the DNS server device is verified to be not prevalent and thus malicious.

Therefore, in the present example of integrity evaluation, the integrity of the DNS server setting is evaluated to be violated, or the security is evaluated to be compromised or at least jeopardized, when it is verified that the acquired IP address of the DNS server device is included in the list of IP address of malicious DNS server devices, and/or when it is verified that the acquired IP address of the DNS server device is not included in the list of IP address of trusted DNS server devices, and/or when it is verified the acquired IP address of the DNS server device is not prevalent. Otherwise, the integrity of the DNS server setting is evaluated to be observed, or the security is evaluated to be ensured, when it is verified that the acquired IP address of the DNS server device passes all verifications, i.e. when the acquired IP address of the DNS server device is not included in the list of IP address of malicious DNS server devices, or is included in the list of IP address of trusted DNS server devices, and/or is prevalent.

Figure 9:
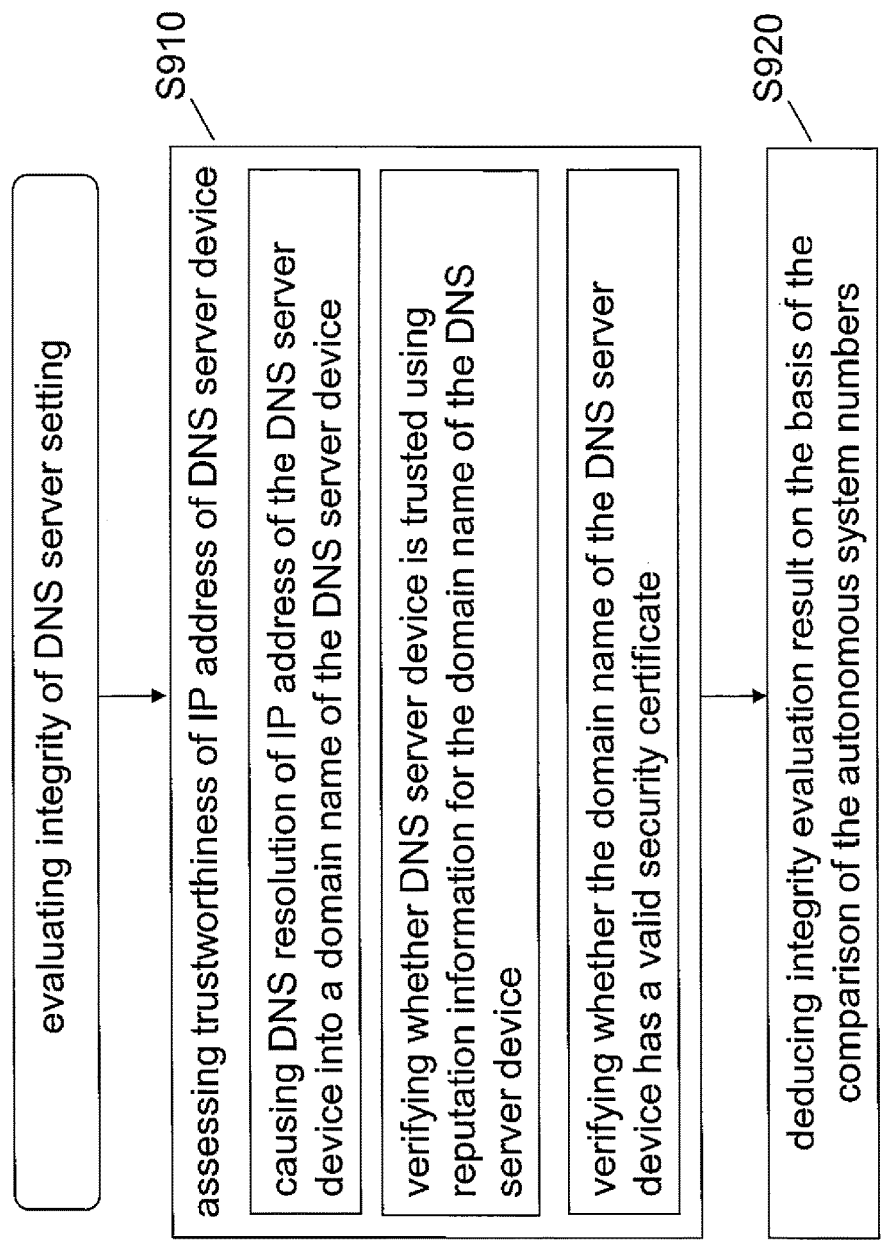

FIG. 9 shows a flowchart illustrating a fifth example of a method for evaluating integrity of a DNS server setting according to exemplifying embodiments of the present invention. The thus illustrated method of FIG. 9 may be applied for integrity evaluation in operation S230 of FIG. 2 and operation S340 of FIG. 3, respectively.

In the method of FIG. 9, the operations S910 and S920 basically correspond to the operations S710 and S720 in the method of FIG. 7, respectively. Accordingly, reference is made to the description of FIG. 7 for details thereof, while a redundant description thereof is omitted.

As shown in FIG. 9, in a method for evaluating integrity of a DNS server setting according to exemplifying embodiments of the present invention, the trustworthiness assessment operation (S910) may comprise an operation of causing DNS resolution of the acquired IP address of the DNS server device into a domain name of the DNS server device, an operation of verifying whether the DNS server device is trusted using reputation information for the domain name of the DNS server device, and an operation of verifying whether the domain name of the DNS server device has a valid security certificate.

The present example of integrity evaluation is based on the concept of reverse DNS lookup for the acquired IP address of the DNS server device, wherein first of all a DNS resolution response is obtained, then a thus obtained domain name of the DNS server device is tested to be one of trusted domains, and finally the acquired domain name is tested to also have a valid certificate, such as a valid SSL (Secure Sockets Layer) certificate, assigned for it. Thereby, trust in (or, trustworthiness of) the acquired IP address of the DNS server device can be increased.

In the following, an example is given for a case in which the service device's or users IP address 213.157.89.153, and the DNS server device's IP address is 217.30.180.230, such DNS server device being used by the service device or user.

Reverse DNS lookup for the DNS server device's IP address gives "resolver1.nebula.fi". A reputation check for the domain "nebula.fi" can be performed, e.g. using a reputation database of a security service provider like F-Secure. When, based on the acquired reputation information thereof, the domain is trusted and not any free DNS provider domain, that DNS server device's IP address can be trusted.

As another example, a check for the public recursive DNS server from Google, having the IP address 8.8.8.8, gives "google-public-dns-a.google.com", and a reputation check for "google.com" yields that it is to be trusted. Whether or not "google.com" has a valid SSL certificate can be verified, e.g. using some ancillary means such as an inquiry to a website like "https://www.sslshopper.com/ssl-checker.html", i.e. the inquiry "https://www.sslshopper.com/ssl-checker.html#hostname=google.com", or by other means.

The result of the inquiry for "google.com" (executed in November 2014) would bring the following result, indicating that a valid SSL certificate is assigned.

—start of result—

The certificate should be trusted by all major web browsers (all the correct intermediate certificates are installed).

Common name: *.google.com

SANs: *.google.com, *.android.com, *.appengine.google.com, *.cloud.google.com, *.google-analytics.com, *.google.ca, *.google.cl, *.google.co.in, *.google.co.jp, *.google.co.uk, *.google.com.ar, *.google.com.au, *.google.com.br, *.google.com.co, *.google.com.mx,

*.google.com.tr, *.google.com.vn, *.google.de, *.google.es, *.google.fr, *.google.hu, *.google.it, *.google.nl, *.google.pl, *.google.pt, *.googleadapis.com, *.googleapis.cn, *.googlecom merce.com, *.googlevideo. com, *.gstatic.cn, *.gstatic.com, *.gvt1.com, *.gvt2.com, *.metric.gstatic.com, *.urchin.com, *.url.google.com, *.youtube-nocookie.com, *.youtube.com, *.youtubeeducation.com, *.ytimg.com, android.com, g.co, goo.gl, google-analytics.com, google.com, googlecommerce.com, urchin.com, youtu.be, youtube.com, youtubeeducation.com Organization: Google Inc
    Location: Mountain View, Calif., US
    Valid from Oct. 22, 2014 to Jan. 19, 2015 Serial Number: 69c8a71742555782
    Signature Algorithm: sha1WithRSAEncryption
    Issuer: Google Internet Authority G2
    —end of result—

On the other hand, reverse DNS lookup for the service device's or user's IP address would not give any domain name, as there is no reverse DNS record for such IP address. This means that the service device's or user's IP address cannot be used as a trusted DNS server device. For example, the result of reverse DNS lookup for the above-indicated IP address 213.157.89.153 gives "***resolvertnebula.fi can't find 213.157.89.153: Non-existent domain"

A reverse DNS lookup for some other IP address could give results like "foobar.kittykat.com", or the like. As such domain name like "kittykat.com" or the like is typically not trusted, i.e. has no affirmative reputation information, or it does not have a valid (e.g. SSL) certificate, it can be concluded that such acquired IP address of a DNS server device is not to be trusted.

Therefore, in the present example of integrity evaluation, the integrity of the DNS server setting is evaluated to be violated, or the security is evaluated to be compromised or at least jeopardized, when it is verified that the DNS server device is not trusted, and/or when it is verified that the domain name of the DNS server device does not have a valid security certificate. Otherwise, the integrity of the DNS server setting is evaluated to be observed, or the security is evaluated to be ensured, when it is verified that all verifications are passed, i.e. when the DNS server device is trusted, and when the domain name of the DNS server device has a valid security certificate.

As mentioned above, the above-described principles according to exemplifying embodiments of the present invention are generally applicable in different situations, i.e. different scenarios, network topologies, system environments, or the like.

An exemplary scenario may be a case in which the service device is an email server, the DNS server device is a DNS server of the email server, and the integrity check function is implemented/realized by some external device, like a computer of a security service provider like F-Secure. In such scenario, there is the possibility of checking if the email service provided by this email server (or, stated in other words, the operator of this email server) is being affected by DNS hacking or hijacking. To this end, an email can be sent to (an email address of a user of) this email server, in which is injected an IP address that resolves into (pseudo-)random domain under the control of the security service provider as the sender's MX (Mail Exchange) server. When the receiver's email server receives such email or when the user reads such email, in the email headers there will be the injected IP address (i.e. the injected IP address will be parsed from the email headers) and it will (have to) be resolved by the email server's DNS server. So, depending on at what point or what machine does the resolving, it can be verified whether the email server or the email server's DNS server are affected by DNS hacking or hijacking. If for example the email server for @nokia.com domains is mx.nokia.com and it resolves an injected IP address of the sender's MX server, e.g. <random>.mx.dnschecker.f-secure.com, it can be said whether the DNS server used by mx.nokia.com belongs to an ASN in China, and whether or not it is the same ASN as what is assigned for the IP address of mx.nokia.com.

Another exemplary scenario may be a case in which the service device is a server, e.g. a server managing a forum (where users can post posts), an online shop (where users can buy things), or the like, which issues a registration confirmation email to a client device of a new user, the DNS server device is a DNS server of such server, and the integrity check function is implemented/realized by some external device, like a computer of a security service provider like F-Secure. In such scenario, there is the possibility of checking if a user using such service is being affected by DNS hacking or hijacking. Usually such forums, etc. have an option for registering an account for a user, and a registration form usually has a field for a user's email address where the server software or the server will send confirmation email. When a (pseudo-)random domain under the control of the security service provider is injected as an email address (e.g. dnscheck©<random>.dnscheck.com), there should be issued a DNS request to the DNS server of the security service provider from the DNS server which is used by the server of the forum, etc. Then, the DNS server's IP address can be used for the integrity/security check, as described herein.

Still another exemplary scenario can relate to a so-called download proxy, in which a user can specify what the user wants to download and the proxy does it for the user. So, the proxy resolves whatever domain or IP address which is linked with the resource which is downloaded for the user wants to.

When a (pseudo-)random sub-domain under the control of a security service provider is injected for the proxy to download, it can be checked whether or not the proxy's DNS is being hacked or hijacked.

Yet another exemplary scenario can relate to Tor (The Onion Router) exit-nodes. Even though on the client side, the DNS server can be seen, which a given P address is supposedly using, that DSN server can be subject to DNS hacking or hijacking. Namely, that DSN server can just be a DNS forwarder whose DNS server setting can have been changed to point e.g, to a recursive DNS server elsewhere. So, (a computer of) a security service provider can connect to a (pseudo-)random domain under the control of the security service provider through Tor and compare the ASN of the IP address of the thus used Tor exit-node against the ASN of the IP address of a recursive DNS server that contacted the (authoritative) DNS server of the security service provider. When these ASNs differ, it can be detected that DNS hacking or hijacking is in progress. A similar check as for Tor exit-nodes can be also be done for VPN solutions, like for VPN (provider) exit nodes.

In the following, one exemplary scenario for the applicability of the present invention is described in more detail. Such scenario relates to a local network environment in which a client (and its router) uses a local DNS server for connecting to a web server (e.g. visiting a website (web-page) on the web server, as a service.

Figure 10:
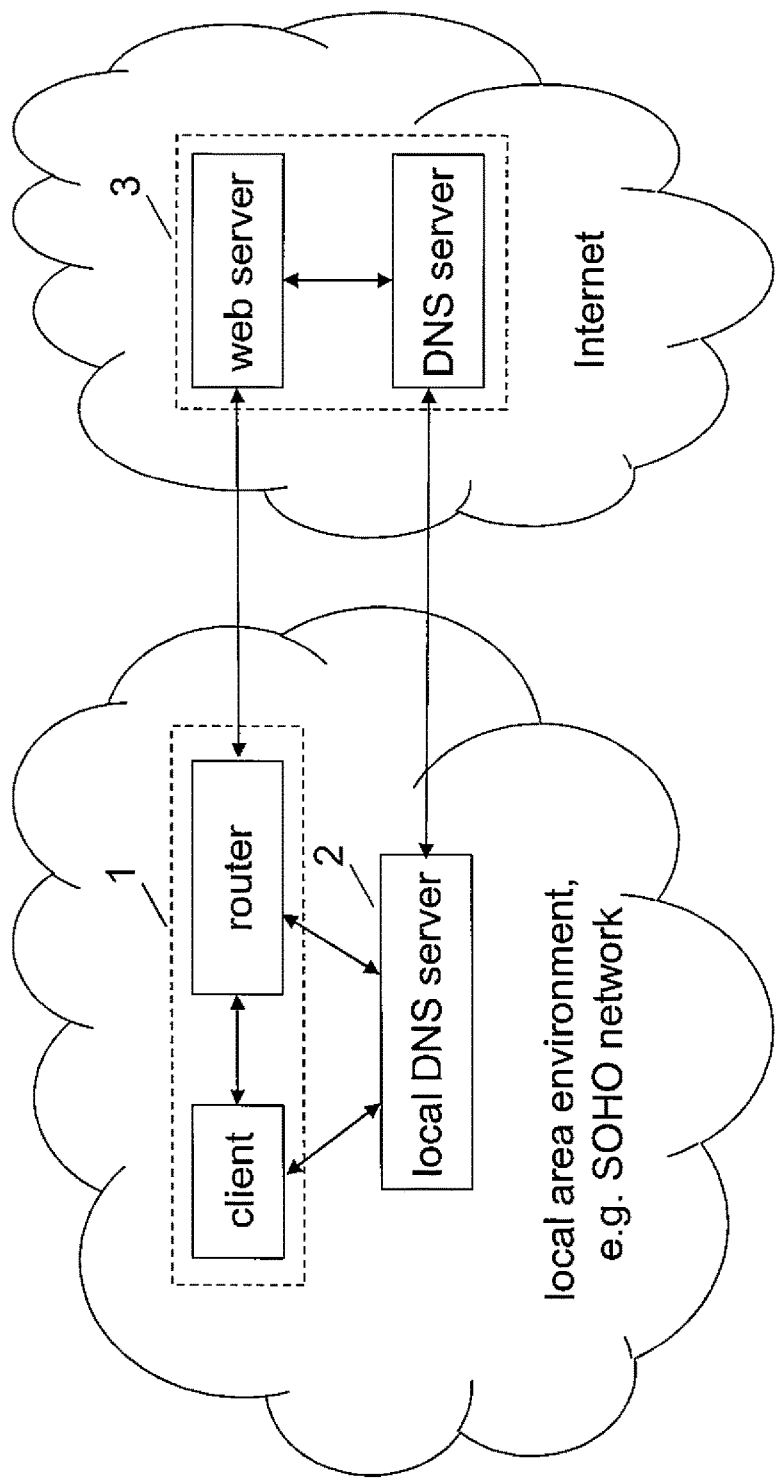
FIG. 10 shows a schematic diagram illustrating an example of a system configuration in a local network environment, for which exemplifying embodiments of the present invention are applicable.

FIG. 10 shows a schematic diagram illustrating an example of a system configuration in a local network environment, for which exemplifying embodiments of the present invention are applicable.

As shown in FIG. 10, exemplifying embodiments of the present invention relate to a system configuration in which a local network environment, such as a home or SOHO network, and the Internet are interconnected. In the local network environment, a client and a router (alone or together) represents a service device 1, wherein the router may be any network equipment serving as a connection point for local clients. For example, the router may serve as an Internet gateway between local clients and a web server in the Internet, which (together with a related DNS server) represents an integrity check function or a device implementing/realizing the integrity check function.

The network equipment may generally be a (local-area) DHCP server device, i.e. any network equipment (in a local network environment) which has DHCP functionality in/for a (local-area) network. For example, such DHCP server device may be implemented in or by a router, e.g. a home or SOHO-type router, a (wireless) base station or access point, or the like. Further, the network equipment may include a local DNS server, i.e. DNS server functionality, which can be used by the client instead of or in addition to the local DNS server.

According to exemplifying embodiments of the present invention, the integrity of a local-area DNS server setting or, stated in other words, the security of an entity keeping the DNS server setting, can be checked. The DNS server setting may be kept in the local DNS server (and/or a local DNS forwarder). Such integrity or security check can be accomplished from a client by connecting to the web server in the Internet or, stated in other words, visiting a website (webpage) on the web server in the Internet by a browser on the client. That is, the functionality of the integrity or security check can be provided by the web server (together with its related DNS server and/or DNS forwarder), e.g. using a website (webpage) which a user of a client can visit in order to check integrity of the user's local-area DNS server setting or, stated in other words, to check security of the user's client device in the local network environment.

It is to be noted that FIG. 10 merely illustrates a non-limiting example of a system configuration, for which exemplifying embodiments of the present invention are applicable. For example, a DHCP server device subject to the security check according to exemplifying embodiments of the present invention does not necessarily have to be the only DHCP server device or Internet gateway in a local network environment, and the number of connected clients and the number of connected Internet servers is not restricted to what is exemplarily illustrated. Moreover, a DHCP server device subject to the security check according to exemplifying embodiments of the present invention does not necessarily have to reside in a local network environment such as a home or SOHO network, but can be any DHCP server device representing or connected to an Internet gateway or, stated in other words, a DHCP server device or network equipment, including a DHCP server device, having DNS address resolution functionality.

In another system configuration, for which exemplifying embodiments of the present invention are applicable, more than one network device providing a DNS service may be present. Accordingly, there may be a case that a local network environment in the meaning of the present specification is structured by a number of at least two local-area sub-/networks (each comprising a DHCP/DNS device) being connected in a serial or layered manner (with respect to an Internet gateway). For example, a local network environment may comprise a router or a modem (e.g. a cable modem, a DSL modem, or the like), representing a DHCP server device of a first or upstream local-area sub-/network, and a separate (e.g. WiFi) access point or base station, serving as gateway device and representing another DHCP server device of a second or downstream local-area sub-/network. In a case like this, it is possible that both network devices have their own DNS server or DNS forwarder providing for DNS service. Hence, when a security check of the gateway device in the first or upstream local-area sub-/network is performed, only the access point or base station in the second or downstream local-area sub-/network will be checked. Thus, a local DNS server setting to a local DNS server of the gateway is preferably also to be checked in terms of security.

Figure 11:
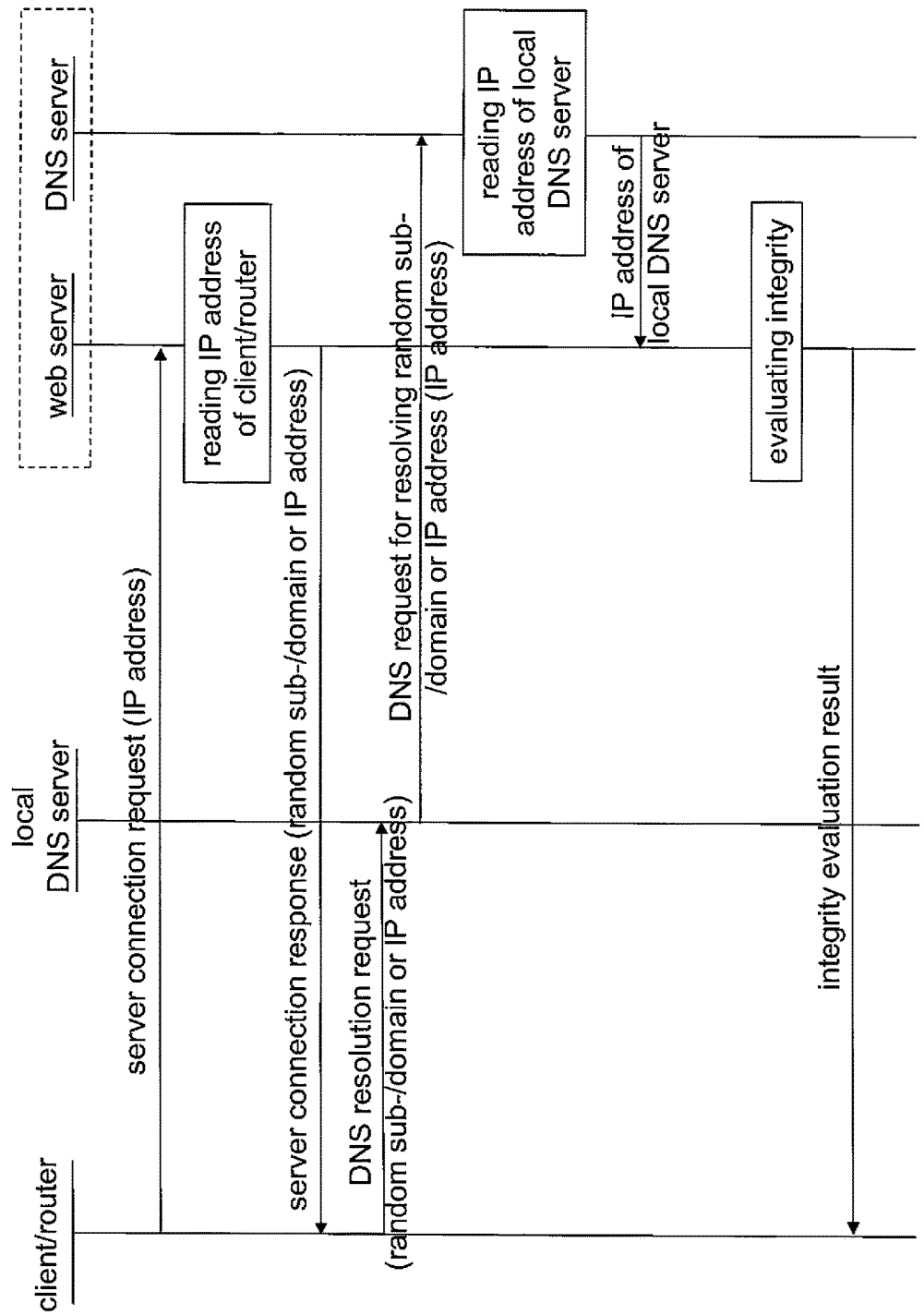
FIG. 11 shows a flowchart illustrating an example of a method for checking integrity of a local-area DNS server setting in a local network environment according to exemplifying embodiments of the present invention.

FIG. 11 shows a diagram illustrating an example of a procedure for checking integrity of a local-area DNS server setting in a local network environment according to exemplifying embodiments of the present invention.

The example system configuration underlying the thus illustrated procedure basically corresponds to the system configuration of FIG. 10, and it is assumed that a client is connected with a router, and the client and/or the router uses a local DNS server (potentially, via at least one DNS forwarder), in the local network environment, while a web server (together with a DNS server) functions as an entity in the Internet or any wide-area network environment, which performs an integrity/security check according to exemplifying embodiments of the present invention. The web server and its related DNS server can be collocated/integrated (as indicated by a dashed box) or separated. It is further assumed that the web server (together with the DNS server) provides the integrity/security check functionality according to exemplifying embodiments of the present invention, specifically in the form or a website (webpage) accessible by the client (possibly subject to a preceding registration at the website (webpage) and/or for a corresponding service of the web server).

The client which wants to check security of its DNS server setting, e.g. the security of its router, can connect to the web server, specifically visit the website (webpage) providing the respective service (e.g. www.checkyourrouter.com), using a web browser. Upon connection/visit, or upon login to a respective service, the web server executes an integrity/security check, which can be exemplified as follows.

When the client connects to the web server or visits the website, the web server can read the public IP address of the client, which is the same as the public IP address of its router when the client and its router are located behind a NAT. That is, the web server is configured to read the public IP address included in a connection operation of the client with the web server.

The connection operation of the client with the web server can be requested using the domain name of the website (e.g. www.checkyourrouter.com) or the IP address of the website (e.g. a.b.c.d). Using the IP address of the website may be beneficial in terms of security. This is because, if a user is affected by DNS hacking or hijacking, the attacker could also hack or hijack the website providing the respective service (e.g. www.checkyourrouter.com) so as to point to an attacker's dummy page that tells the user that everything is ok, i.e. there is no DNS hacking or hijacking in progress. Accordingly, e.g. upon registration at the website (webpage) and/or for a corresponding service of the web server, the user can be advised to use the IP address of the website (instead of its domain name) to visit the website for an integrity/ security check. In that case, an attacker cannot carry out any DNS hacking or hijacking in order to direct user to a fake site.

The connection operation of the client with the web server can be requested via a secure connection, e.g. using HTTPS (Hypertext Transfer Protocol Secure). That is, the website can be a HTTPS website (e.g. https://www.checkyourrouter.com). This is because, if user is affected by the DNS hacking hijacking, the attacker could also hack or hijack the website providing the respective service (e.g. www.checkyourrouter.com) so as to point to an attacker's dummy page that tells the user that everything is ok, i.e. there is no DNS hacking or hijacking in progress. In order to prevent this, a secure connection e.g. using HTTPS can be used for the website so that the attacker cannot forge the website's certificate. Otherwise, the user will get a warning about a bad certificate when trying to visit the website.

Both of the above features can also be combined such that the connection operation of the client with the web server can be requested via a secure connection, e.g. using HTTPS (Hypertext Transfer Protocol Secure), using the IP address of the website (e.g. https://a.b.c.d).

When the client has connected to the web server or visited the website, the server can read the IP address of the local DNS server. That is, the web server is configured to read the IP address of the local DNS server included in a DNS request from the local DNS server to the DNS server related to the web server (or, as mentioned above, in a subsequent DNS reply from the DNS server related to the web server to the local DNS server).

More specifically, the server may respond to the server connection request by way of a server connection response including a DNS resolution trigger in the form of a domain name of a unique (e.g. a (pseudo-)random) sub-/domain or IP address to be resolved in such domain name. Thereby, a corresponding DNS resolution request from the client/router to the local DNS server (potentially, via at least one DNS forwarder) is triggered, and the local DNS server sends a corresponding DNS request for the triggered DNS resolution, i.e. for resolving the injected unique random sub-/domain or IP address, which includes its IP address. Then, the DNS server related to the web server can read the IP address of the local DNS server included in such DNS request, and, if not collocated/integrated anyway, the DNS server related to the web server can provide the read IP address of the local DNS server to its web server.

That is, the IP address of the local DNS server being used by the client and/or the client's router can be figured out at the web server by having a resource on the website that forces the client's browser to initiate a DNS resolution. Such dedicated resource points to a unique domain that is under control of the web server or its operator (or, any sub-domain thereof). This means that the client's DNS server, i.e. the local DNS server, will eventually create a DNS request directly to the DNS server related to the web server, i.e. a DNS server under control of the web server or its operator. Thereby, this DNS server will get the IP address of the client's or the router's (local) DNS server.

For example, the dedicated resource can be an HTML (Hypertext Markup Language) image link on the website, while a connection operation of the client may comprise clicking on the HTML image link on the website. The HTML image link may for example be in the form:

<IMG SRC="<random>.checkyourrouter.com/picturelpg">

For further details in this regard, reference is made to the description of FIG. 4 above.

By virtue of exemplifying embodiments of the present invention, as S described above, an integrity check of a DNS server setting is enabled/realized. Thereby, integrity of a DNS server setting used by any service in any scenario can be checked without requiring specific system administration skills.

The integrity/security check according to exemplifying embodiments of the present invention is easy to use, as it can be carried out on the basis of service-related traffic in a (semi-)autonomous manner. Accordingly, no dedicated software and/or hardware arrangements are needed at a user/client/service side, and the user, the client or the service provider does not require any credentials for some network equipment.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIGS. 12 and 13, while for the sake of brevity reference is made to the detailed description of respective corresponding configurations/setups, schemes, methods and functionality, principles and operations according to FIGS. 1 to 11.

Figure 12:
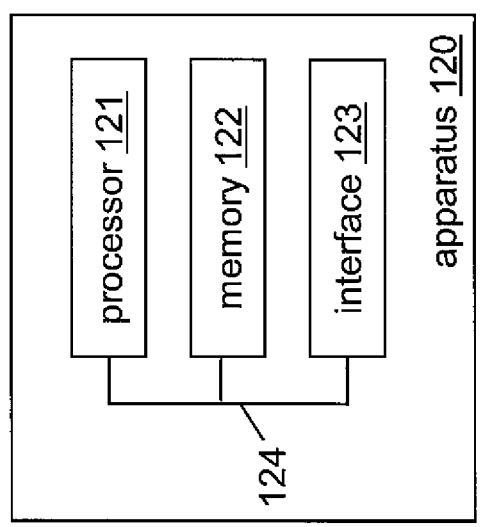
FIG. 12 shows a schematic diagram illustrating an example of a structure of an apparatus according to exemplifying embodiments of the present invention.
Figure 13:
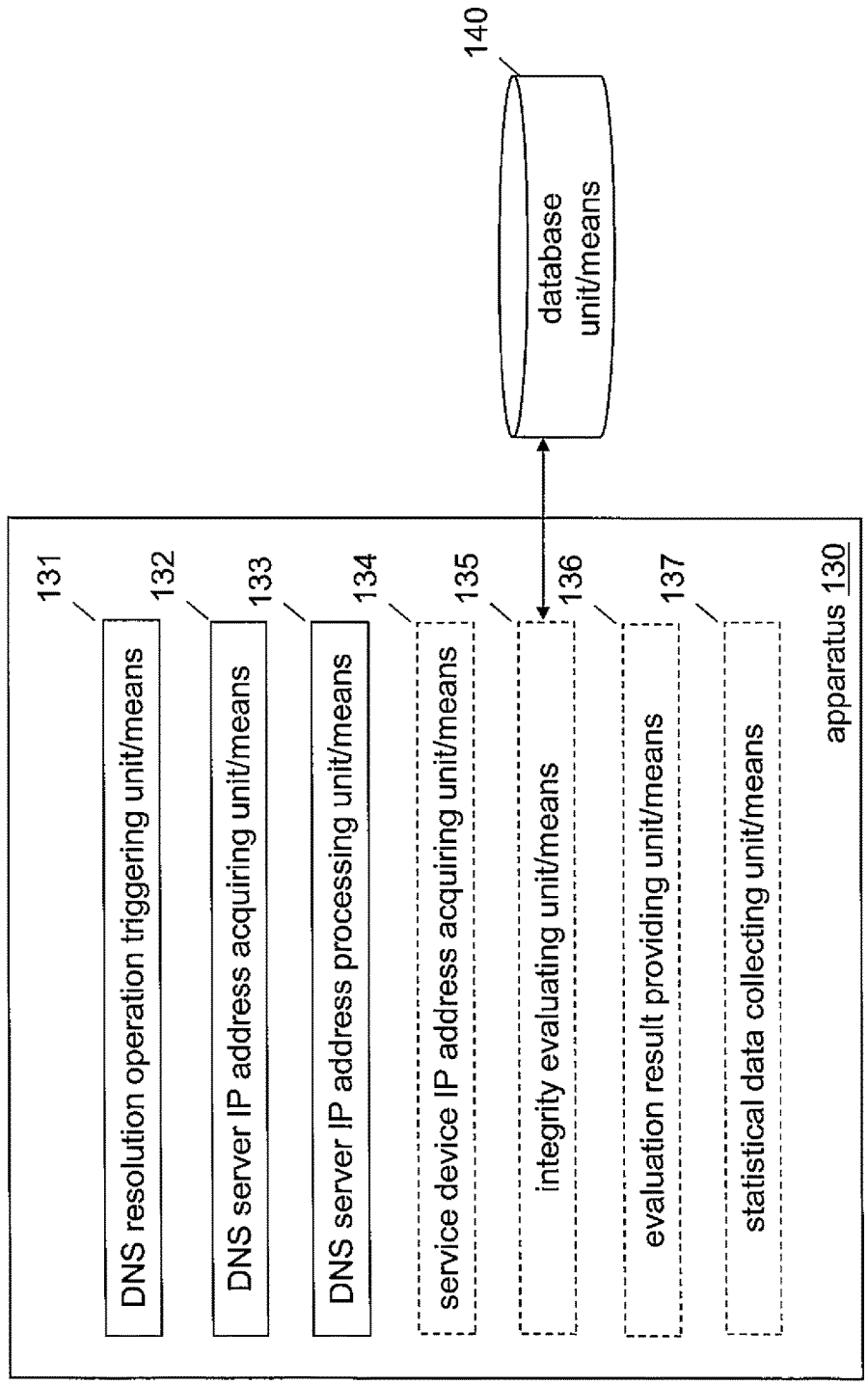
FIG. 13 shows a schematic diagram illustrating another example of a structure of an apparatus according to exemplifying embodiments of the present invention.

In FIGS. 12 and 13, the solid line blocks are basically configured to perform respective methods, procedures and/or functions as described above. The entirety of solid line blocks are basically configured to perform the methods, procedures and/or functions as described above, respectively. With respect to FIGS. 12 and 13, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 12 and 13, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

FIG. 12 shows a schematic diagram illustrating an example of a structure of an apparatus according to exemplifying embodiments of the present invention.

As indicated in FIG. 12, an apparatus 120 according to exemplifying embodiments of the present invention may comprise at least one processor 121 and at least one memory 122 (and possibly also at least one interface 123), which may be operationally connected or coupled, for example by a bus 124 or the like, respectively.

The processor 121 of the apparatus 120 is configured to read and execute computer program code stored in the memory 122. The processor may be represented by a CPU (Central Processing Unit), a MPU (Micro Processor Unit), etc., or a combination thereof. The memory 122 of the apparatus 120 is configured to store computer program code, such as respective programs, computer/processor-executable instructions, macros or applets, etc. or parts of them. Such computer program code, when executed by the processor 121, enables the apparatus 120 to operate in accordance with exemplifying embodiments of the present invention. Further, the memory 122 of the apparatus 120 may store or at least temporarily hold any relevant information, such as information of uniquely determined resources, a registration of users of a service providing the integrity/security check, commonly known DNS servers and their IP addresses, ASN/IP mappings, additional useful information for user information purposes, or the like. The memory 122 may be represented by a RAM (Random Access Memory), a ROM (Read Only Memory), a hard disk, a secondary storage device, etc., or a combination of two or more of these. The interface 123 of the apparatus 120 is configured to interface with another apparatus and/or the user of the apparatus 120. That is, the interface 123 may represent a communication interface (including e.g. a modem, an antenna, a transmitter, a receiver, a transceiver, or the like), and could also comprise a user interface (such as a display, touch screen, keyboard, mouse, signal light, loudspeaker, or the like).

The apparatus 120 may, for example, represent a (part of a) integrity check function or device. The apparatus 120 may be configured to perform a procedure and/or exhibit a functionality as described in any one of FIGS. 2 to 3 and 6 to 9.

The apparatus 120 or its processor 121 (possibly together with computer program code stored in the memory 122), in its most basic form, is configured to trigger a DNS resolution operation by a service device configured to provide a service using the DNS server setting, wherein the DNS server setting is used for DNS resolution or DNS forwarding in service provisioning, acquire the IP address of a DNS server device, which is configured to perform DNS resolution in service provisioning, by reading the IP address of the DNS server device included in a DNS message as part of the triggered DNS resolution operation by the service device, and process the acquired IP address of the DNS server device, especially for evaluating integrity of the DNS server setting used in service provisioning.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 12 above, i.e. by one or more processors 121, one or more memories 122, one or more interfaces 123, or any combination thereof.

FIG. 13 shows a schematic diagram illustrating another example of a structure of an apparatus according to exemplifying embodiments of the present invention.

As shown in FIG. 13, an apparatus 130 according to exemplifying embodiments of the present invention may comprise (at least) a unit or means for triggering a DNS resolution operation by a service device configured to provide a service using the DNS server setting (denoted as DNS resolution operation triggering unit/means 131), a unit or means for acquiring the IP address of a DNS server device, which is configured to perform DNS resolution in service provisioning, by reading the IP address of the DNS server device included in a DNS message as part of the triggered DNS resolution operation by the service device (denoted as DNS server IP address acquiring unit/means 132), and a unit or means for processing the acquired IP address of the DNS server device, especially for evaluating integrity of the DNS server setting used in service provisioning (denoted as DNS server IP address processing unit/means 132).

As further shown in FIG. 13, an apparatus 130 according to exemplifying embodiments of the present invention may additionally comprise (at least) a unit or means for acquiring the IP address of the service device (denoted as service device IP address acquiring unit/means 134), and/or a unit or means for evaluating integrity of the DNS server setting of the DNS server device (denoted as integrity evaluating unit/means 135), and/or a unit or means for providing a result of the evaluation of the integrity of the DNS server setting to the service device (denoted as evaluation result providing unit/means 136), and/or a unit or means for collecting statistical data with regard to usage of DNS server devices and/or DNS forwarder devices and/or potential integrity issues relating to a DNS server device (denoted as statistical data collecting unit/means 137).

As further shown in FIG. 13, the integrity evaluating unit/means 135 is operable to interact/cooperate with at last one database (denoted as database unit/means 140). Such database may for example be or comprise a dedicated and/or combined data store for DNS servers, ASNs, trustworthiness information, reputation information, DNS records, or the like. Depending on the kind of integrity evaluation performed, a corresponding interaction/cooperation may take place, such as in the context of any evaluation in any one of operations S230, S340, S510, S610, S710, S810 and S910, as described above. Irrespective of the illustration in FIG. 13, the database unit/means 140 may be implemented in/at the apparatus 130 (e.g. stored in the memory 122 in FIG. 12) or in/at any other entity.

For further details regarding the operability/functionality of the individual units/means according to exemplifying embodiments of the present invention, reference is made to the above description in connection with any one of FIGS. 1 to 11, respectively.

Figure 14:
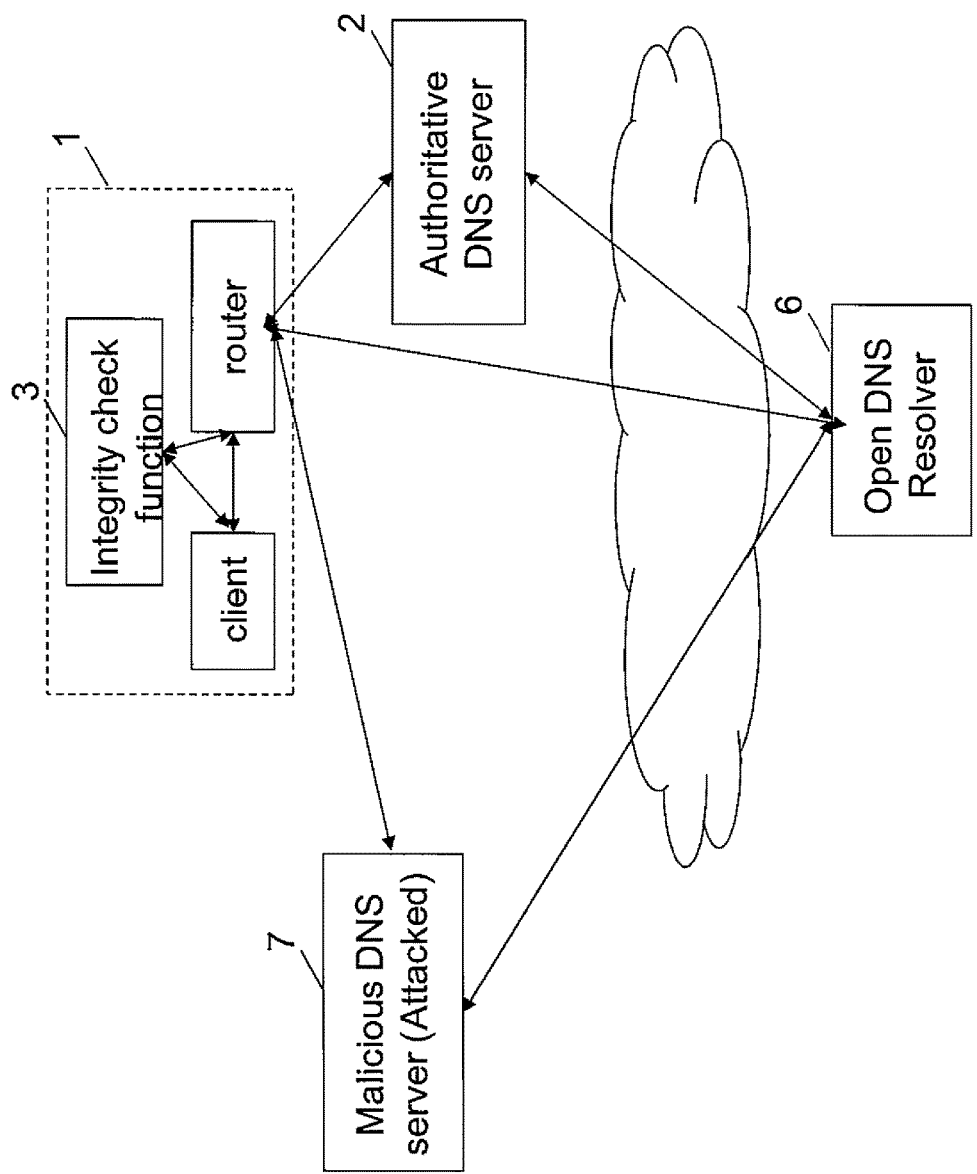
FIG. 14 shows a schematic diagram illustrating an example of a system configuration for which exemplifying embodiments of the present invention are applicable.

FIG. 14 shows a schematic diagram illustrating an example of a system configuration in a network environment, for which exemplifying embodiments of the present invention are applicable.

In this embodiment of the present invention a problem of detecting if a local client is being DNS hijacked when using an open DNS resolver 6 such as GoogleDNS, OpenDNS or Tier-2 DNS is addressed. Malicious DNS servers can be configured to selectively use open DNS resolvers for resolving domains that they are not hijacking or for domains that are used in the integrity check function. This kind of selective use of open DNS resolver may cause the integrity check to reveal the IP address of the open DNS resolver but not the IP address of the malicious DNS server. In the following embodiment, an example method is described that will determine if client's DNS request is in reality handled by some unknown remote DNS server 7 that is using an open DNS resolver 6.

As shown in FIG. 14, exemplifying embodiments of the present invention relate to a system configuration in which a local network environment, such as a home or SOHO network, and the Internet are interconnected. In the local network environment, a client and a router (alone or together) represents a service device 1, wherein the router may be any network equipment serving as a connection point for local clients. The integrity check function 3 represents any means and/or functional parts (such as software) thereof which is configured to check integrity of a DNS server setting.

The network equipment may generally be a (local-area) DHCP server device, i.e. any network equipment (in a focal network environment) which has DHCP functionality in/for a (local-area) network. For example, such DHCP server device may be implemented in or by a router, e.g. a home or SOHO-type router, a (wireless) base station or access point, or the like. Further, the network equipment may include a local DNS server, i.e. DNS server functionality, which can be used by the client instead of or in addition to the local DNS server.

In this example, the integrity check function may be implemented by a software running on client computer or in close proximity network, such as a security device in the home network. This example implementation comprises comparing the time it takes to make a DNS query by using client computer's or home network's normal DNS settings with the time it takes to make a DNS query directly to the same open DNS provider client seems to be using. If the first delay is significantly and consistently greater than the second, it should be an indication that client DNS traffic is being managed by some remote DNS server (here malicious DNS server 7) before it is passed to the open DNS resolver.

Delays generated by computing devices (routers, DNS servers) along the path from the client device to the public DNS resolver should be an order of magnitude smaller when compared to network related delays. For example, when comparing delays generated by the following two setups, the delay between setups 1 and 2 should consistently be insignificant:

1. Client device is configured (by DHCP) to use the home router as it's DNS server (or as DNS forwarder). The DNS request of the client will be processed by the router and the router generates a new DNS request to ISP's DNS server it is configured to use.
2. Client device is configured (by DHCP) to use DNS server of the ISP. The router only does packet forwarding and no new DNS request is made.

However, network related latency differences are measurable and consistent. In the following example setups have significant, measurable and consistent lag differences:

1. Client device is configured (by DHCP) to use home router as it's DNS server. The home router is configured by an attacker to use malicious DNS server elsewhere. The malicious DNS server selectively uses an open DNS resolver.
2. Client device is configured (by DHCP) to use home router as it's DNS server. The home router is configured by the ISP to use an open DNS resolver.
3. Client device is configured (by DHCP) to use home router as it's DNS server. The home router is configured to use DNS of the ISP. ISP's DNS is configured to use an open DNS resolver.

In general own DNS server of the ISP should be located so that it is network-lag-wise at closest possible distance from the client device as the ISP is the one providing the network access. Thus there should not be any extra network latency generated by the use of ISP DNS server (option 3) when compared with client's home router using the open DNS resolver directly (option 2).

However, if client's home router is configured to use malicious DNS server (option 1), there should always be an extra network related latency generated from the routing packets from the home router to the malicious DNS server and back (DNS reply). The delay it takes to make the open DNS resolver query should be more or less the same regardless whether it is made from the home router's network location or from the malicious DNS server's network location.

Figure 15:
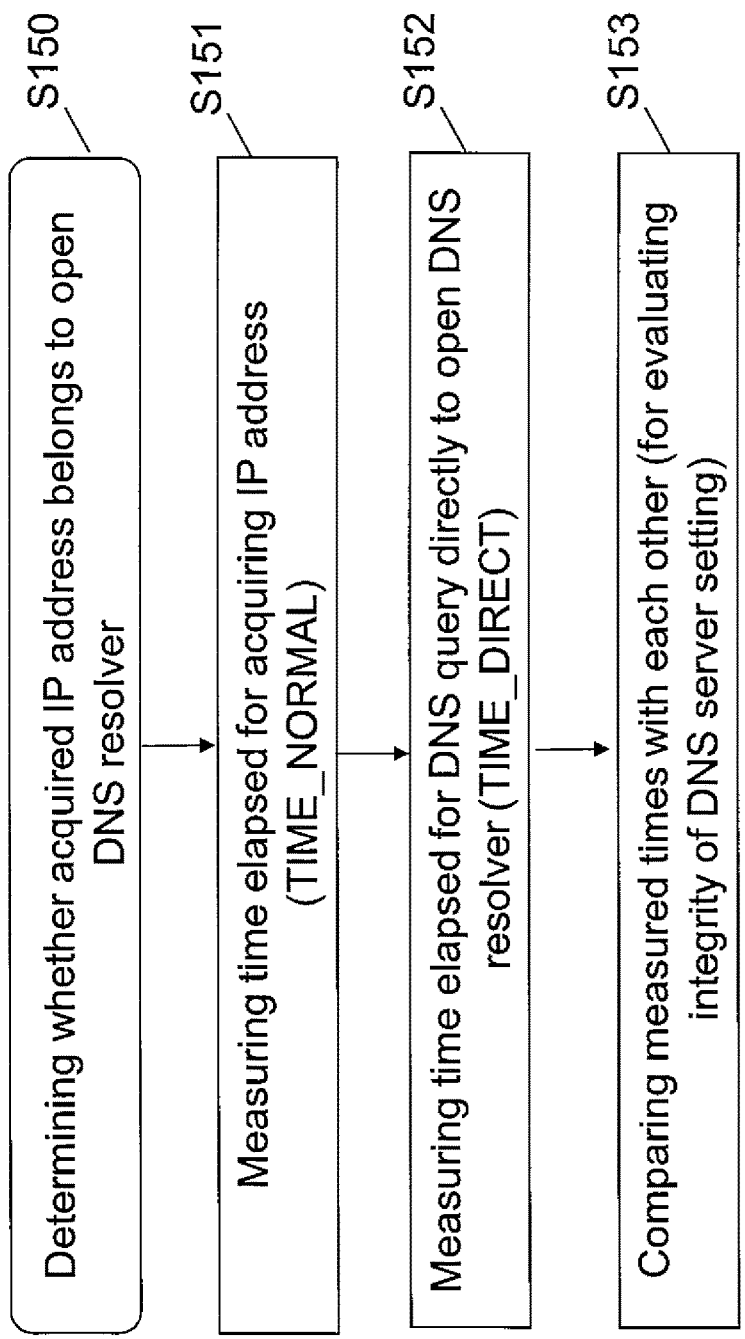
FIG. 15 shows a flowchart illustrating a method for checking integrity of a DNS server setting according to exemplifying embodiments of the present invention.

As shown in FIG. 15, a method for checking integrity of a DNS server by latency discrepancy according to exemplifying embodiments of the present invention first comprises an operation (S150) of determining the DNS resolver IP address that the client is using (as described in the earlier examples). The acquired IP address is evaluated to determine whether it belongs to an open DNS resolver. This evaluation may be implemented in any method available. For example, ASN or AS Organization belongs to Google. In the next step (S151), an operation of measuring the time it took to make the inquiry for the IP address is made. In the following, this measured time elapsed for acquiring the IP address of the DNS server device is called TIME_NORMAL. It is possible to calculate minimum, maximum and/or average times in order to get consistent measures. In the next step (S152) the integrity check function is used to measure how long it takes to make the DNS query directly to the same open DNS provider. In the following, this measured time elapsed for making the DNS query directly to the open DNS resolver is called TIME_DIRECT. In this step, the DNS settings the client device or the home router is using are disregarded. In the next step (S153), the measured elapsed times, TIME_NORMAL and TIME_DIRECT, are compared with each other. In the next step (S154), it is determined whether TIME_DIRECT is significantly and consistently smaller than TIME_NORMAL. If so, this can be used as an indication that the client DNS is being "routed around the world" or hijacked. As malicious DNS server will not be able to reduce the extra network related latency that is required by it being present, there is the possibility to detect it. Therefore the DNS server setting used in service provisioning can be evaluated to be violated when TIME_DIRECT is smaller than TIME_NORMAL by a predetermined amount. In an embodiment, a threshold value can be determined for evaluating the amount of the measured elapsed times TIME_DIRECT and TIME_NORMAL. In case the difference exceeds this predetermined threshold value, then a determination is made that there is a violation.

As earlier described, the integrity of a local-area DNS server setting or, stated in other words, the security of an entity keeping the DNS server setting, is checked.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing an integrity check of a DNS server setting, thereby enabling/realizing detection of DNS hacking or hijacking. Such measures could exemplarily comprise triggering a DNS resolution operation by a service device configured to provide a service using the DNS server setting, wherein the DNS server setting is used for DNS resolution or DNS forwarding in service provisioning, acquiring the IP address of a DNS server device, which is configured to perform DNS resolution in service provisioning, by reading the IP address of the DNS server device included in a DNS message as part of the triggered DNS resolution operation by the service device, and processing the acquired IP address of the DNS server device for evaluating integrity of the DNS server setting used in service provisioning.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A method of checking integrity of a DNS server setting, comprising
    triggering a DNS resolution operation by a service device configured to provide a service using the DNS server setting, wherein the DNS server setting is used for DNS resolution or DNS forwarding in service provisioning through one or more DNS server devices, each having an associated IP address, wherein the DNS resolution operation refers to a domain name of a domain or sub-domain hosted by or under control of an integrity check device or an IP address of an integrity check device in service-related traffic,
    acquiring the IP address of a DNS server device, which is configured to perform DNS resolution in service provisioning, by reading the IP address of the DNS server device included in a DNS message sent by the DNS server device to the service device as part of the triggered DNS resolution operation by the service device,
    processing the acquired IP address of the DNS server device for evaluating integrity of the DNS server setting used in service provisioning, and
    acquiring the IP address of the service device,
    wherein evaluating integrity of the DNS server setting of the DNS server device comprises:
        retrieving an autonomous system number of the acquired IP address of the service device and an autonomous system number of the acquired IP address of the DNS server device, said step of retrieving the autonomous system numbers comprising performing an inquiry for the autonomous system numbers using the acquired IP address of the service device and the acquired IP address of the DNS server device and extracting the autonomous system number of the acquired IP address of the service device and the autonomous system number of the acquired IP address of the DNS server device from an inquiry response, and
        comparing the retrieved autonomous system numbers.

2. The method according to claim 1, wherein
    the IP address of the DNS server device is read in a DNS request for requesting DNS resolution of the domain name into an IP address of the integrity check device or requesting DNS resolution of the IP address of the integrity check device into a domain name of a domain or sub-domain hosted by or under control of the integrity check device, which DNS request is sent from the DNS server device to a DNS server device of the integrity check device, or in a DNS reply for providing requested DNS resolution of the domain name into an IP address of the integrity check device or requested DNS resolution of the IP address of the integrity check device into a domain name of a domain or sub-domain hosted by or under control of the integrity check device, which DNS reply is sent from a DNS server device of the integrity check device to the DNS server device.

3. The method according to claim 1, wherein
the DNS resolution operation refers to a uniquely determined domain or sub-domain hosted by or under control of the integrity check device.

4. The method according to claim 3, wherein the uniquely determined domain or sub-domain relates to a resource hosted by or under control of the integrity check device.

5. The method according to claim 1, wherein
the integrity of the DNS server setting used in service provisioning is evaluated to be violated when the autonomous system number of the acquired IP address of the service device differs from the autonomous system number of the acquired IP address of the DNS server device, or
the integrity of the DNS server setting used in service provisioning is evaluated to be unknown when the autonomous system number of the acquired IP address of the service device differs from the autonomous system number of the acquired IP address of the DNS server device, and the acquired IP address of the DNS server device corresponds to an IP address of a commonly known DNS server device.

6. The method according to claim 1, wherein evaluating integrity of the DNS server setting of the DNS server device comprises assessing trustworthiness of the acquired IP address of the DNS server device by one or more of:
verifying whether the acquired IP address of the DNS server device is included in a list of IP address of malicious DNS server devices,
verifying whether the acquired IP address of the DNS server device is included in a list of IP address of trusted DNS server devices, and
verifying whether the acquired IP address of the DNS server device is prevalent on the basis of a frequency and/or number of previous acquisitions of the acquired IP address of the DNS server device.

7. The method according to claim 6, wherein
the integrity of the DNS server setting used in service provisioning is evaluated to be violated when it is verified that the acquired IP address of the DNS server device is included in the list of IP address of malicious DNS server devices, and/or when it is verified that the acquired IP address of the DNS server device is not included in the list of IP address of trusted DNS server devices, and/or when it is verified the acquired IP address of the DNS server device is not prevalent.

8. The method according to claim 6, wherein assessing trustworthiness of the acquired IP address of the DNS server device comprises
causing DNS resolution of the acquired IP address of the DNS server device into a domain name of the DNS server device,
verifying whether the DNS server device is trusted using reputation information for the domain name of the DNS server device, and
verifying whether the domain name of the DNS server device has a valid security certificate.

9. The method according to claim 8, wherein
the integrity of the DNS server setting used in service provisioning is evaluated to be violated when it is verified that the DNS server device is not trusted, and/or when it is verified that the domain name of the DNS server device does not have a valid security certificate, and/or
the security certificate is a SSL certificate.

10. The method according to claim 1, further comprising providing a result of the evaluation of the integrity of the DNS server setting used in service provisioning to the service device,
wherein the provided evaluation result comprises an indication of observance or violation of the integrity of the DNS server setting, or an indication of observance or violation of the integrity of the DNS server setting together with statistical data with regard to usage of DNS server devices and/or DNS forwarder devices by service devices and/or potential integrity issues relating to the DNS server device.

11. An apparatus, comprising
a memory configured to store computer program code, and
a processor configured to read and execute computer program code stored in the memory, wherein
the processor is configured to cause the apparatus to perform:
triggering a DNS resolution operation by a service device configured to provide a service using the DNS server setting, wherein the DNS server setting is used for DNS resolution or DNS forwarding in service provisioning through one or more DNS server devices, each having an associated IP address, wherein the DNS resolution operation refers to a domain name of a domain or sub-domain hosted by or under control of an integrity check device or an IP address of an integrity check device in service-related traffic,
acquiring the IP address of a DNS server device, which is configured to perform DNS resolution in service provisioning, by reading the IP address of the DNS server device included in a DNS message sent by the DNS server device to the service device as part of the triggered DNS resolution operation by the service device,
processing the acquired IP address of the DNS server device for evaluating integrity of the DNS server setting used in service provisioning, and
acquiring the IP address of the service device,
wherein evaluating integrity of the DNS server setting of the DNS server device comprises:
retrieving an autonomous system number of the acquired IP address of the service device and an autonomous system number of the acquired IP address of the DNS server device, said step of retrieving the autonomous system numbers comprising performing an inquiry for the autonomous system numbers using the acquired IP address of the service device and the acquired IP address of the DNS server device and extracting the autonomous system number of the acquired IP address of the service device and the autonomous system number of the acquired IP address of the DNS server device from an inquiry response, and comparing the retrieved autonomous system numbers.

12. The apparatus according to claim 11, wherein the processor is configured to read the IP address of the DNS server device in a DNS request for requesting DNS resolution of the domain name into an IP address of the integrity check device or requesting DNS resolution of the IP address of the integrity check device into a domain name of a domain or sub-domain hosted by or under control of the integrity check device, which DNS request is sent from the DNS server device to a DNS server device of the integrity check device, or in a DNS reply for providing requested DNS resolution of the domain name into an IP address of the integrity check device or requested DNS resolution of the IP address of the integrity check device into a domain name of a domain or sub-domain hosted by or under control of the integrity check device, which DNS reply is sent from a DNS server device of the integrity check device to the DNS server device.

13. The apparatus according to claim 12, wherein the processor is configured to cause the apparatus to evaluate the integrity of the DNS server setting used in service provisioning to be violated when the autonomous system number of the acquired IP address of the service device differs from the autonomous system number of the acquired IP address of the DNS server device, or the processor is configured to cause the apparatus to evaluate the integrity of the DNS server setting used in service provisioning to be unknown when the autonomous system number of the acquired IP address of the service device differs from the autonomous system number of the acquired IP address of the DNS server device, and the acquired IP address of the DNS server device corresponds to an IP address of a commonly known DNS server device.

14. The apparatus according to claim 11, wherein the DNS resolution operation refers to a uniquely determined domain or sub-domain hosted by or under control of the integrity check device.

15. The apparatus according to claim 11, wherein the processor is configured to cause the apparatus to perform assessing trustworthiness of the acquired IP address of the DNS server device by one or more of:
verifying whether the acquired IP address of the DNS server device is included in a list of IP address of malicious DNS server devices,
verifying whether the acquired IP address of the DNS server device is included in a list of IP address of trusted DNS server devices, and
verifying whether the acquired IP address of the DNS server device is prevalent on the basis of a frequency and/or number of previous acquisitions of the acquired IP address of the DNS server device.

16. A computer program product comprising a non-transitory computer readable medium having computer-executable computer program code stored thereon which, when the computer program code is executed on a computer, is configured to cause the computer to carry out a method comprising:

triggering a DNS resolution operation by a service device configured to provide a service using the DNS server setting, wherein the DNS server setting is used for DNS resolution or DNS forwarding in service provisioning through one or more DNS server devices, each having an associated IP address, wherein the DNS resolution operation refers to a domain name of a domain or sub-domain hosted by or under control of an integrity check device or an IP address of an integrity check device in service-related traffic, acquiring the IP address of a DNS server device, which is configured to perform DNS resolution in service provisioning, by reading the IP address of the DNS server device included in a DNS message sent by the DNS server device to the service device as part of the triggered DNS resolution operation by the service device, processing the acquired IP address of the DNS server device for evaluating integrity of the DNS server setting used in service provisioning, and acquiring the IP address of the service device, wherein evaluating integrity of the DNS server setting of the DNS server device comprises:
retrieving an autonomous system number of the acquired IP address of the service device and an autonomous system number of the acquired IP address of the DNS server device, said step of retrieving the autonomous system numbers comprising performing an inquiry for the autonomous system numbers using the acquired IP address of the service device and the acquired IP address of the DNS server device and extracting the autonomous system number of the acquired IP address of the service device and the autonomous system number of the acquired IP address of the DNS server device from an inquiry response, and comparing the retrieved autonomous system numbers.

* * * * *